United States Patent
Lee et al.

(10) Patent No.: US 11,507,851 B2
(45) Date of Patent: Nov. 22, 2022

(54) SYSTEM AND METHOD OF INTEGRATING DATABASES BASED ON KNOWLEDGE GRAPH

(71) Applicant: Samsung Electronics Co., Ltd., Suwon-si (KR)

(72) Inventors: Yunsu Lee, Suwon-si (KR); Taeho Hwang, Suwon-si (KR); Soohyung Kim, Suwon-si (KR); Heejin Kim, Suwon-si (KR); Jaehun Lee, Suwon-si (KR); Hyonsok Lee, Suwon-si (KR); Jiyoung Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 649 days.

(21) Appl. No.: 16/558,993

(22) Filed: Sep. 3, 2019

(65) Prior Publication Data

US 2020/0134477 A1 Apr. 30, 2020

(30) Foreign Application Priority Data

Oct. 30, 2018 (KR) .......................... 10-2018-0131110

(51) Int. Cl.
| | | |
|---|---|---|
| *G06F 15/16* | (2006.01) | |
| *G06F 9/54* | (2006.01) | |
| *H04L 29/06* | (2006.01) | |
| *G06N 5/02* | (2006.01) | |
| *G06K 9/62* | (2022.01) | |
| *G06N 20/00* | (2019.01) | |

(52) U.S. Cl.
CPC .............. *G06N 5/02* (2013.01); *G06K 9/628* (2013.01); *G06K 9/6263* (2013.01); *G06N 20/00* (2019.01)

(58) Field of Classification Search
CPC ........ G06N 5/02; G06N 20/00; G06K 9/6263; G06K 9/628
USPC .......................................................... 706/46
See application file for complete search history.

(56) References Cited

U.S. PATENT DOCUMENTS

| | | | |
|---|---|---|---|
| 10,102,291 B1 * | 10/2018 | Steiger .................. | G06F 16/289 |
| 10,198,491 B1 * | 2/2019 | Semturs ................ | G06F 16/367 |
| 10,990,988 B1 * | 4/2021 | Goyette ............. | G06Q 30/0202 |

(Continued)

FOREIGN PATENT DOCUMENTS

KR    10-1226162 B1    1/2013

OTHER PUBLICATIONS

International Search Report dated Dec. 4, 2019, issued in the International Application No. PCT/KR2019/011267.

*Primary Examiner* — Hamza N Algibhah
(74) *Attorney, Agent, or Firm* — Jefferson IP Law, LLP

(57) ABSTRACT

An artificial intelligence (AI) system that utilizes a machine learning algorithm, such as deep learning, etc. and an application of the AI system is provided. A method, performed by a server, of integrating and managing a plurality of databases (DBs) includes obtaining a plurality of knowledge graphs related to DBs generated from the plurality of DBs having different structures from one another, inputting the plurality of knowledge graphs related to DBs into a learning model related to DB for determining a correlation between data in the plurality of DBs, and obtaining a virtual integrated knowledge graph output from the learning model related to DB and including information about a correlation extracted from the plurality of knowledge graphs related to DBs.

16 Claims, 24 Drawing Sheets

(56) References Cited

U.S. PATENT DOCUMENTS

| | | | |
|---|---|---|---|
| 10,997,244 B2* | 5/2021 | Russell | G06F 21/56 |
| 11,308,104 B2* | 4/2022 | Riscutia | G06F 16/24 |
| 2015/0095303 A1* | 4/2015 | Sonmez | G06N 5/003 |
| | | | 707/707 |
| 2015/0379414 A1 | 12/2015 | Yeh et al. | |
| 2016/0055205 A1* | 2/2016 | Jonathan | G06F 16/2456 |
| | | | 707/714 |
| 2016/0098645 A1 | 4/2016 | Sharma et al. | |
| 2016/0253364 A1* | 9/2016 | Gomadam | G06F 16/26 |
| | | | 707/739 |
| 2016/0314158 A1* | 10/2016 | Kelly | G06F 16/217 |
| 2017/0075918 A1 | 3/2017 | Bates-Haus et al. | |
| 2017/0132329 A1* | 5/2017 | Yakout | G06F 16/9024 |
| 2017/0249382 A1* | 8/2017 | Venkataraman | G06F 16/3344 |
| 2018/0082183 A1* | 3/2018 | Hertz | G06N 5/00 |
| 2018/0121546 A1* | 5/2018 | Dingwall | G06F 16/951 |
| 2018/0218015 A1 | 8/2018 | Haddock | |
| 2019/0056726 A1* | 2/2019 | Weldemariam | G05D 1/0022 |
| 2019/0065620 A1* | 2/2019 | Murray | G06F 16/9024 |
| 2019/0102430 A1* | 4/2019 | Wang | G06F 16/367 |
| 2019/0287006 A1* | 9/2019 | Costabello | G06F 16/9024 |
| 2019/0370607 A1* | 12/2019 | Lecue | G06K 9/6268 |
| 2020/0050946 A1* | 2/2020 | Lecue | G06N 20/00 |
| 2020/0097601 A1* | 3/2020 | Han | G06F 16/288 |
| 2020/0117737 A1* | 4/2020 | Gopalakrishnan | |
| | | | G06F 16/9535 |
| 2020/0118010 A1* | 4/2020 | Lee | G06Q 30/0201 |
| 2020/0133211 A1* | 4/2020 | Lee | H04N 21/4665 |
| 2022/0138826 A1* | 5/2022 | Wang | G06Q 30/0643 |
| | | | 705/26.63 |
| 2022/0156599 A1* | 5/2022 | Pai | G06K 9/6215 |

* cited by examiner

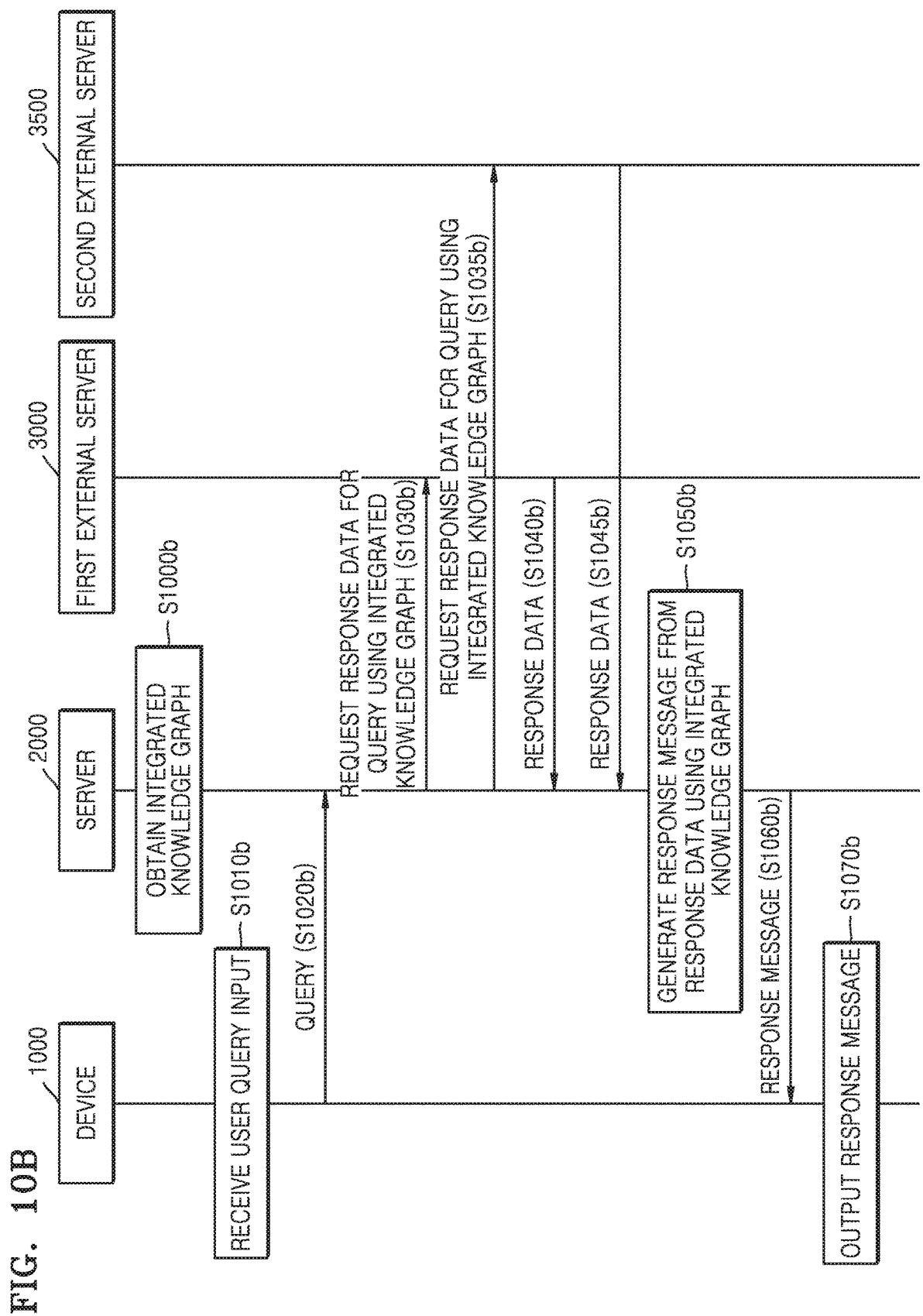

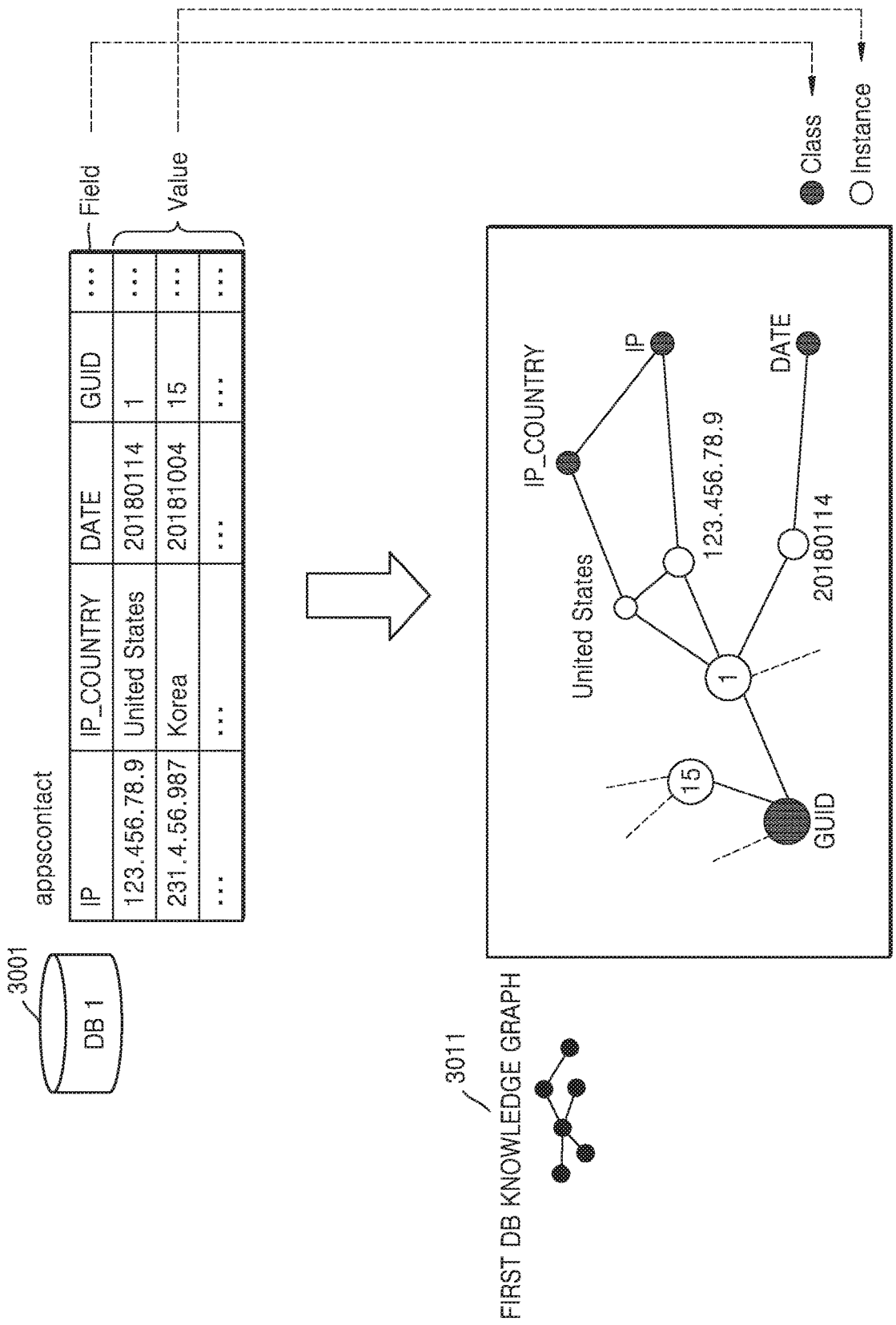

SYSTEM AND METHOD OF INTEGRATING DATABASES BASED ON KNOWLEDGE GRAPH

CROSS-REFERENCE TO RELATED APPLICATION(S)

This application is based on and claims priority under 35 U.S.C. § 119(a) of a Korean patent application number 10-2018-0131110, filed on Oct. 30, 2018, in the Korean Intellectual Property Office, the disclosure of which is incorporated by reference herein in its entirety.

BACKGROUND

1. Field

The disclosure relates to a system and a method of integrating databases based on a knowledge graph. More particularly, the disclosure relates to a system and a method of integrating databases based on a knowledge graph representing a correlation between data included in heterogeneous databases and obtained using an artificial intelligence learning model.

2. Description of Related Art

An artificial intelligence (AI) system is a computer system with human level intelligence. Unlike an existing rule-based smart system, the AI system is a system that trains itself autonomously, makes decisions, and becomes increasingly smarter. The more the AI system is used, the more the recognition rate of the AI system may improve and the AI system may more accurately understand a user preference. Thus, an existing rule-based smart system is being gradually replaced by a deep learning based AI system.

AI technology refers to machine learning (deep learning) and element technologies that utilize the machine learning. Machine learning is an algorithm technology that classifies/learns the features of input data autonomously. Element technology is a technology that simulates the functions of the human brain, such as recognition and judgment by utilizing machine learning algorithm, such as deep learning and consists of technical fields, such as linguistic understanding, visual comprehension, reasoning/prediction, knowledge representation, and motion control.

AI technology is applied to various fields as follows. Linguistic understanding is a technology to recognize and apply/process human language/characters and includes natural language processing, machine translation, dialogue systems, query response, speech recognition/synthesis, and the like. Visual comprehension is a technology to recognize and process objects like human vision and includes object recognition, object tracking, image search, human recognition, scene understanding, spatial understanding, image enhancement, and the like. Reasoning prediction is a technology to acquire and logically infer and predict information and includes knowledge/probability based reasoning, optimization prediction, preference based planning, recommendation, and the like. Knowledge representation is a technology to automate human experience information into knowledge data and includes knowledge building (data generation/classification), knowledge management (data utilization), and the like. Motion control is a technology to control autonomous traveling of a vehicle and motion of a robot, and includes motion control (navigation, collision avoidance, and traveling), operation control (behavior control), and the like.

On the other hand, due to the recent development of network technology, an environment in which a large amount of information used in various fields is scattered in different forms physically or logically in different positions is being created. It is difficult for users to know where necessary data is, and thus sufficient time and effort must be taken to find desired information from these information resources. In addition, due to the heterogeneity of data, there is a difficulty in requiring expert knowledge to obtain information in the linked and integrated forms.

Attempts have been made in several ways to integrate distributed databases, such as using a single database. For example, an integrated database that integrates distributed databases may be constructed through separately predefined rules or protocols.

However, there is a problem that a method of constructing the integrated database may be integrated only into a structure that is suitable for a predefined specific purpose, and the scalability is low. For example, adding a new database to the integrated database requires definition of a new rule, and the integrated database does not reflect real-time updates of databases. In addition, the above-described method has a problem that a storage space and computing resources are wasted because the integrated database is constructed separately from an existing database.

Therefore, there is a need for technology capable of integrating different databases while addressing the above issues.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a system and a method of obtaining an integrated knowledge graph representing a correlation between data in a plurality of databases using a learning model related to database.

Another aspect of the disclosure is to provide a system and a method of responding to a user's query on a plurality of databases using the integrated knowledge graph.

Another aspect of the disclosure is to provide a system and a method of recognizing a conflict existing between a plurality of databases and standardizing conflicted data using the integrated knowledge graph.

Additional aspects will be set forth in part in the description which follows and, in part, will be apparent from the description, or may be learned by practice of the presented embodiments.

In accordance with an aspect of the disclosure, a method, performed by a server, of integrating and managing a plurality of databases (DBs) is provided. The method includes obtaining a plurality of knowledge graphs related to DBs generated from the plurality of DBs having different structures from one another, inputting the plurality of knowledge graphs related to DBs into a learning model related to DB for determining a correlation between data in the plurality of DBs, and obtaining a virtual integrated knowledge graph output from the learning model related to DB and including information about a correlation extracted from the plurality of knowledge graphs related to DBs.

In accordance with another aspect of the disclosure, a server for integrating and managing a plurality of databases (DBs) based on a knowledge graph is provided. The server includes a memory configured to store one or more instructions, and at least one processor configured to execute the one or more instructions to obtain a plurality of knowledge graphs related to DBs generated from the plurality of DBs having different structures from one another, input the plurality of knowledge graphs related to DBs into a learning model related to DB for determining a correlation between data in the plurality of DBs, and obtain a virtual integrated knowledge graph output from the learning model related to DB and including information about a correlation extracted from the plurality of knowledge graphs related to DBs.

In accordance with another aspect of the disclosure, at least one non-transitory computer program product including a computer readable recording medium is provided. The computer program product includes a program to obtain a plurality of DBs knowledge graphs generated from a plurality of DBs having different structures from one another, input the plurality of knowledge graphs related to DBs into a learning model related to DB for determining a correlation between data in the plurality of DBs, and obtain a virtual integrated knowledge graph output from the learning model related to DB and including information about a correlation extracted from the plurality of knowledge graphs related to DBs is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10B is a diagram illustrating a method, performed by a system, of responding to a query of a user for a plurality of databases using an integrated knowledge graph according to an embodiment of the disclosure;

FIG. 11 is a diagram illustrating databases and knowledge graphs related to DBs according to an embodiment of the disclosure;

Throughout the drawings, it should be noted that like reference numbers are used to depict the same or similar elements, features, and structures.

DETAILED DESCRIPTION

Figure 1:
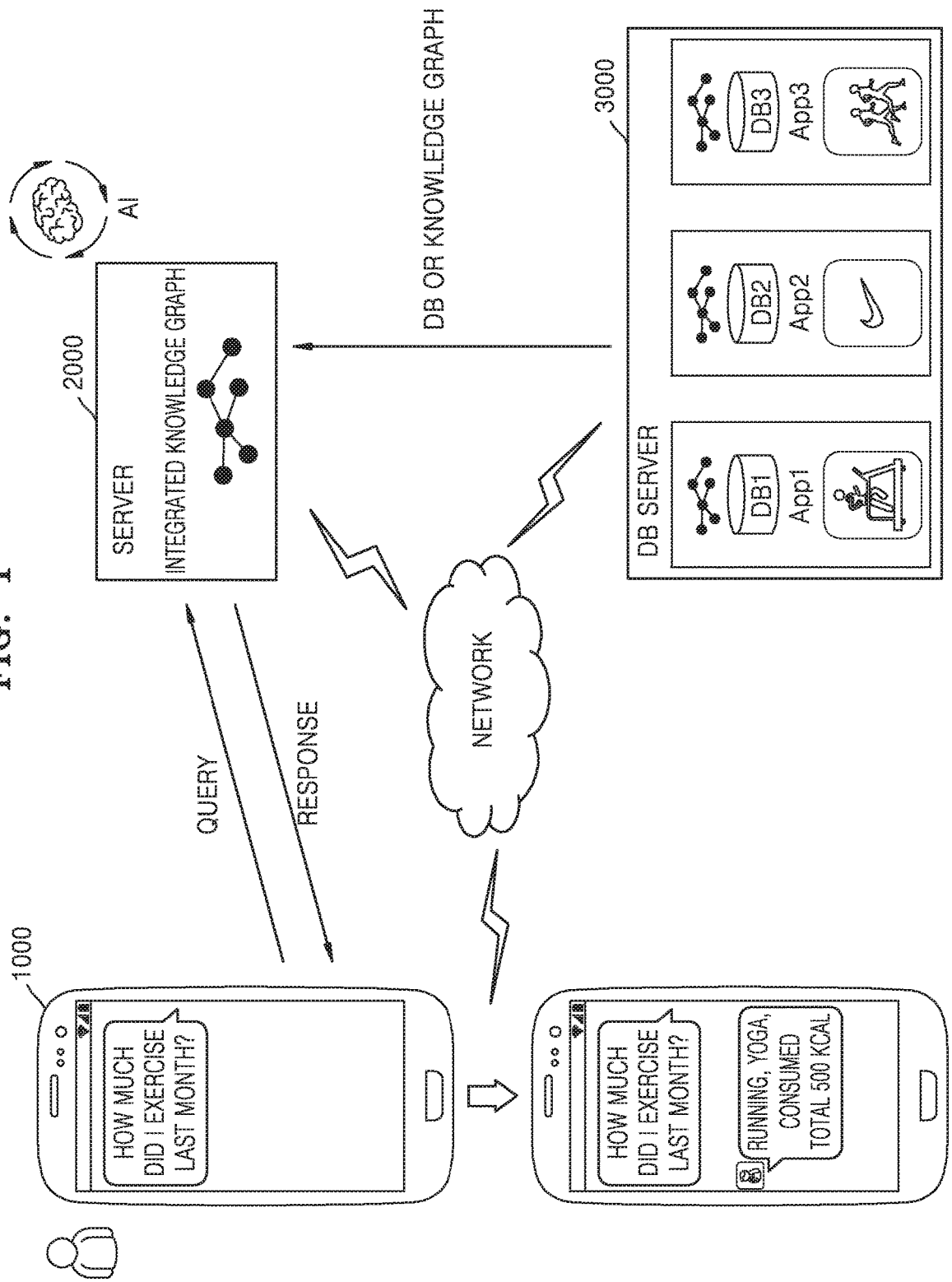
FIG. 1 is a schematic diagram of a system integrating databases based on a knowledge graph according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

Throughout the disclosure, the expression "at least one of a, b or c" indicates only a, only b, only c, both a and b, both a and c, both b and c, all of a, b, and c, or variations thereof.

In this specification, databases (DBs) may be stored and used in various devices for use in various applications. The databases may be stored in a device collecting data, stored in a separate database server, and shared using a network.

The databases may be organized in different structures or formats according to purposes thereof. For example, the database may be a hierarchical model, a relational model, an object-oriented model, an object-relational model, a multimedia data, or a knowledge graph. For example, the database may have a different schema. The schema defines a database and includes a structure of data, a method of representation, a relation among data, constraints, an access right needed to manage the database, security policies, integrity rules, etc.

The knowledge graph related to database (DB) may be a knowledge graph generated based on the database. The knowledge graph related to DB may be generated based on the schema and data of the database, and may include a location of the database, the structure of the database, and a correlation between the data in the database.

An integrated knowledge graph may be a knowledge graph generated from a plurality of databases. The integrated knowledge graph may be an integration of a plurality of knowledge graphs related to DBs generated from a plurality of databases. The integrated knowledge graph may include information about the location and structure of each of the plurality of databases, and the correlation between data belonging to different databases. The integrated knowledge graph may be different from an integrated database in which a plurality of databases are physically integrated, and may include information for virtually linking the plurality of databases.

A learning model may be an artificial intelligence algorithm which may be a learning model trained by using at least one of machine learning, neural network, gene, deep learning, or a classification algorithm.

Hereinafter, the disclosure will be described by explaining embodiments of the disclosure with reference to the attached drawings.

FIG. 1 is a schematic diagram of a system integrating databases based on a knowledge graph according to an embodiment of the disclosure.

Referring to FIG. 1, the system integrating the databases based on the knowledge graph may include a device 1000, a server 2000, and at least one database server 3000.

The device 1000 may be a terminal for a user to receive a service using a plurality of databases stored in the database server 3000.

In various embodiments of the disclosure, the device 1000 may receive a query input of the user for the plurality of databases. The device 1000 may transmit a query of the user to the server 2000 based on the query input. The device 1000 may receive a response message for the query generated from the server 2000 and output the received response message.

The server 2000 may generate an integrated knowledge graph representing a correlation between data in the plurality of databases, based on the plurality of databases. The server 2000 may provide the service using the plurality of databases to the user based on the integrated knowledge graph.

The integrated knowledge graph may be a knowledge graph generated from the plurality of databases. The integrated knowledge graph may be an integration of a plurality of knowledge graphs related to DBs generated from the plurality of databases. The integrated knowledge graph may include information about a location and a structure of each of the plurality of databases, and the correlation between data belonging to different databases. The integrated knowledge graph may be different from an integrated database in which a plurality of databases are physically integrated, and may include information for virtually linking the plurality of databases.

In various embodiments of the disclosure, the server 2000 may use the integrated knowledge graph to generate the response message to the query of the user. The server 2000 may transmit the generated response message to the device 1000.

The database server 3000 may be a server storing and managing a database. In various embodiments of the disclosure, the database server 3000 may transmit the database to the server 2000. In other embodiments of the disclosure, the database server 3000 may generate the knowledge graph related to DB from the database and transmit the generated knowledge graph to the server 2000. In FIG. 1, the plurality of databases are described as being located in the database server 3000, but the disclosure is not limited thereto. The plurality of databases may be respectively implemented as separate DB servers (not shown).

The device 1000 may be a smart phone, a tablet PC, a PC, a smart TV, a mobile phone, a personal digital assistant (PDA), a laptop, a media player, a micro server, a global positioning system (GPS) device, an e-book terminal, a digital broadcast terminal, a navigation device, a kiosk, an MP3 player, a digital camera, a consumer electronics, and another mobile or non-mobile computing device, but the disclosure is not thereto. In addition, the device 1000 may be a wearable device, such as a watch, a pair of glasses, a hair band, a ring, etc. having a communication function and a data processing function, but the disclosure is not thereto. The device 1000 may include all kinds of devices capable of transmitting and receiving data through a network with the server 2000 and the content providing server 3000.

The device 1000, the server 2000, and the database server 3000 may be interconnected by the network. The network may include a local area network (LAN), a wide area network (WAN), a value added network (VAN), a mobile radio communication network, a satellite communication network, and a mutual combination of these, may be a data communication network having a comprehensive meaning for allowing each network constituent shown in FIG. 1 to communicate smoothly with each other, and may include a wired Internet, a wireless Internet, and a mobile wireless communication network.

Wireless communication may include, for example, Wi-Fi, Bluetooth, Bluetooth low energy, ZigBee, Wi-Fi Direct (WFD), ultra-wideband (UWB), infrared Data Association (IrDA), Near Field Communication (NFC), and the like, but the disclosure is not thereto.

For example, the device 1000, the server 2000, and the database server 3000 are shown in FIG. 1 as separate devices that are distinguished from each other, but the disclosure is not necessarily limited thereto. The device 1000, the server 2000, and the database server 3000 may be separate devices that are physically distinguished or may be separate entities that are logically distinguished within the physically same device or may be the totally same device. For example, the device 1000 may be the same device as the server 2000. For example, the server 2000 and the database server 3000 may be the same server.

In addition, for example, each of the device 1000, the server 2000, and the database server 3000 are illustrated as one device in FIG. 1, but the disclosure is not necessarily limited thereto. The device 1000, the server 2000, and the database server 3000 may each be a set of one or more physically separate devices that are functionally linked to perform the operations described above.

Figure 2:
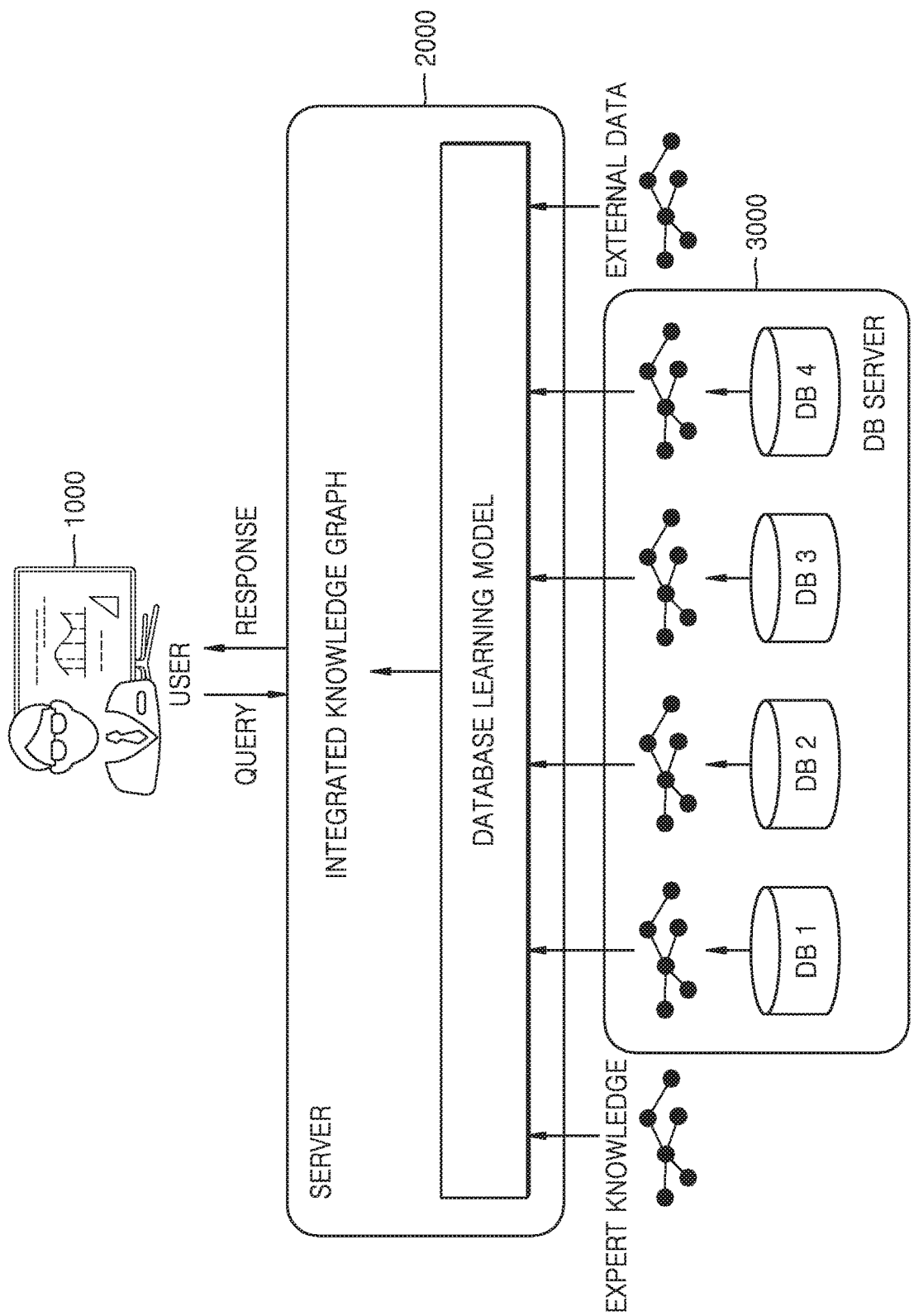
FIG. 2 is a schematic diagram of a system obtaining an integrated knowledge graph from databases using a learning model according to an embodiment of the disclosure.

FIG. 2 is a schematic diagram of a system obtaining an integrated knowledge graph from databases using a learning model according to an embodiment of the disclosure.

Referring to FIG. 2, the system obtaining the integrated knowledge graph from the databases using the learning model may include the device 1000, the server 2000, and the database server 3000.

The database server 3000 may store a plurality of databases. The databases may be each used by a different application or device, and may be configured in different structures or formats according to the purpose of use.

FIG. 2 shows an embodiment of the disclosure in which a plurality of databases DB 1, DB 2, DB 3, and DB 4 are stored in one database server 3000, but the disclosure is not limited thereto. For example, a plurality of database servers, which are physically or logically distinguished, may be connected through a network, and different databases may be stored in different database servers. Alternatively, one database may be distributed or overlapped and stored in multiple database servers.

The server 2000 may obtain a plurality of knowledge graphs related to DBs generated from a plurality of databases. The database (DB) knowledge graph may be a knowledge graph generated based on a database. The knowledge graph related to DB may be generated based on schema and data of the database, and may include a location of the database, a structure of the database, and a correlation between data.

The server 2000 may input the plurality of knowledge graphs related to DBs into a learning model related to DB for determining the correlation between the data in the plurality of databases.

The learning model related to DB may be a learning model learning a criterion, a method, etc. for determining the correlation between the data in the plurality of databases. In various embodiments of the disclosure, the learning model related to DB may be an artificial intelligence algorithm which may be a learning model trained using at least one of machine learning, neural network, gene, deep learning, or a classification algorithm.

In various embodiments of the disclosure, the server 2000 may further input additional data into the learning model related to DB, besides the plurality of knowledge graphs related to DBs. The additional data may be data that is independent of the databases, and may be predefined expert knowledge, external data, or the like. The learning model related to DB may determine a correlation between the additional data and the data in the plurality of databases.

The server 2000 may obtain an integrated knowledge graph including information about the correlation output from the learning model related to DB and extracted from the plurality of knowledge graphs related to DBs. The integrated knowledge graph may include information about the location and structure of each of the plurality of databases, and the correlation between data belonging to different databases. The integrated knowledge graph may be different from an integrated database in which a plurality of databases are physically integrated, and may include information for virtually linking the plurality of databases. In various embodiments of the disclosure, the integrated knowledge graph may include information about the correlation between data belonging to different databases.

The device 1000 may receive a query input of a user for the plurality of databases. The device 1000 may transmit the query of the user to the server 2000 based on the query input.

The server 2000 may generate a response message to a query of the user using the integrated knowledge graph. The server 2000 may transmit the generated response message to the device 1000. The device 1000 may receive the response message from the server 2000 and output the received response message.

Figure 3:
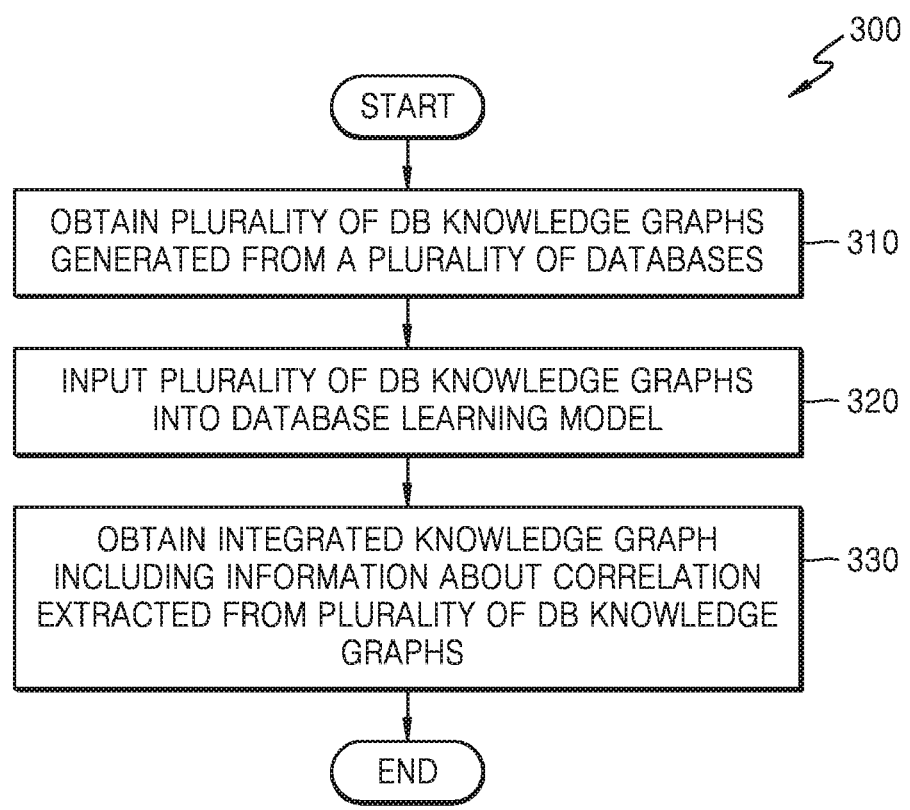
FIG. 3 is a flowchart of a method of obtaining an integrated knowledge graph from databases using a learning model according to an embodiment of the disclosure.

FIG. 3 is a flowchart of a method of obtaining an integrated knowledge graph from databases using a learning model according to an embodiment of the disclosure.

Figure 15:
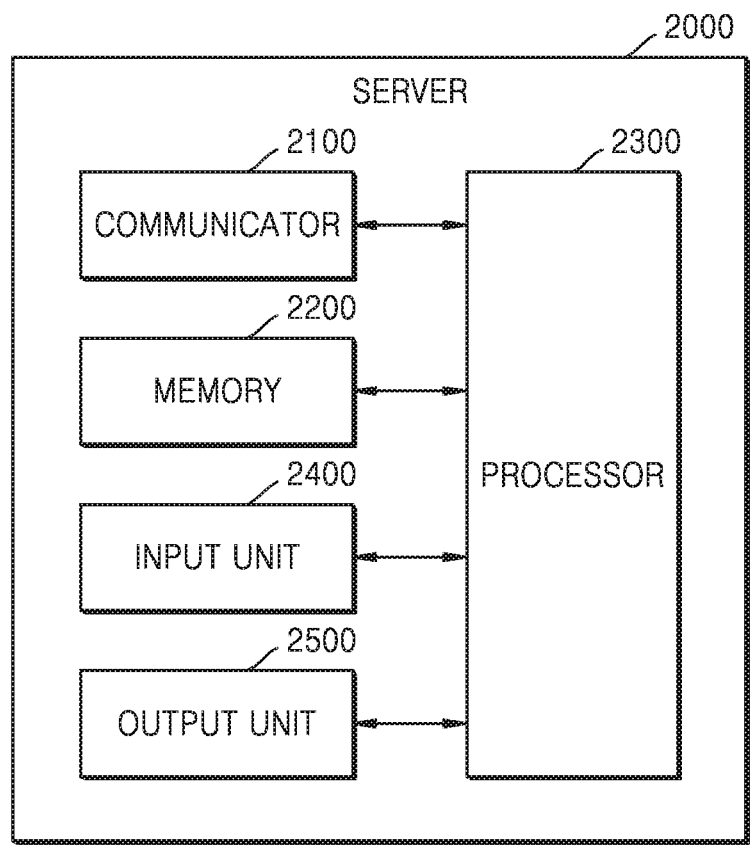
FIG. 15 is a block diagram of a server according to an embodiment of the disclosure.

The method may be performed by the server 2000 shown in FIG. 1, the server 2000 shown in FIG. 2, or the server 2000 or a processor 2300 of the server 2000 shown in FIG. 15.

Referring to FIG. 3, in operation 310, the server 2000 may obtain a plurality of knowledge graphs related to DBs generated from a plurality of databases. For example, the server 2000 may obtain a first knowledge graph generated based on a first database and a second knowledge graph generated based on a second database.

A database may include data fields representing classifications of data. Databases may include data values that are values corresponding to the data fields.

The knowledge graph related to DB may be a knowledge graph generated based on the database. The knowledge graph related to DB may be generated based on the schema and data of the database, and may include a location of the database, the structure of the database, and a correlation between the data in the database.

Each knowledge graph related to DB may include a node corresponding to a data field and a data value in the database, and an edge corresponding to a correlation between nodes. The node of the knowledge graph may include a class corresponding to the data field of the database and an instance corresponding to the data value. In this case, the edge of the knowledge graph may represent a correlation between data fields (between a class and a class), between data values (between an instance and an instance), or between a data field and a data value (between a class and an instance).

A correlation may represent a method of relating a pair of nodes, corresponding to a pair of data, to each other in a knowledge graph. In various embodiments of the disclosure, the correlation may be represented by a predicate with a pair of data/node as a subject and an object, respectively. For example, the correlation may include the same relation (sameAs), an affiliation relation (type), or an inclusion relation (subClassOf), etc., but the disclosure is not limited thereto. The correlation may be a one-way relation, such as the affiliation relation or the inclusion relation, or may be a two-way relation, such as the same relation.

In operation 320, the server 2000 may input the plurality of knowledge graphs related to DBs into a learning model related to DB for determining a correlation between data in the plurality of databases. The server 2000 may input the first knowledge graph related to the first DB and the second knowledge graph related to the second DB into a learning model related to DB for determining a correlation between data included in the first knowledge graph and data included in the second knowledge graph.

The learning model related to DB may be a learning model learning a criterion and a method, etc. for determining the correlation between the data in the plurality of databases. The learning model related to DB may provide a function of extracting nodes in the knowledge graph related to DB and deducing the correlation between the nodes. In various embodiments of the disclosure, the learning model related to DB may be an artificial intelligence algorithm which may be a learning model trained using at least one of machine learning, neural network, gene, deep learning, or a classification algorithm.

In various embodiments of the disclosure, the learning model related to DB may include a first learning model for determining a correlation between data fields constituting the plurality of databases, and a second learning model for determining the correlation between the data values in the plurality of databases. The first learning model and the second learning model will be described in FIG. 4, which will be described later.

In various embodiments of the disclosure, the server 2000 may further input additional data into the learning model related to DB, besides the plurality of knowledge graphs related to DBs. The additional data may be data that is independent of the databases stored in the database server 3000, and may be predefined expert knowledge, external data, or the like. For example, the expert knowledge may include a product classification system of a company, and the external data may include a standard country code, a standard language code, etc. In some embodiments of the disclosure, the additional data may be knowledge graphs, or may be processed in the form of a knowledge graph and input into a learning model.

In operation 330, the server 2000 may obtain an integrated knowledge graph including information about the correlation output from the learning model related to DB and extracted from the plurality of knowledge graphs related to DBs. The integrated knowledge graph may include information about a location and a structure of each of the plurality of databases, and the correlation between data belonging to different databases.

In some embodiments of the disclosure, the integrated knowledge graph may be a virtual graph for virtually integrating and linking the plurality of databases. For example, the integrated knowledge graph may not substantially integrate or change the plurality of databases but may include information that virtually integrates and links the databases in a layer different from the plurality of databases.

In various embodiments of the disclosure, the integrated knowledge graph may only include information about the correlation between the data in the plurality of databases. For example, the integrated knowledge graph may include only the information about the correlation between the data, instead of including information about all data included in the plurality of databases.

In various embodiments of the disclosure, the integrated knowledge graph may include information about a correlation between data included in different databases. The integrated knowledge graph may include an edge representing a correlation between nodes included in different knowledge graphs related to DBs. For example, the integrated knowledge graph may include an edge representing a correlation between a first class of the first knowledge graph related to the first DB and a second class of the second knowledge graph related to the second DB. For example, the integrated knowledge graph may include an edge representing a correlation between a first instance of the first knowledge graph and a second instance of the second knowledge graph.

Figure 4:
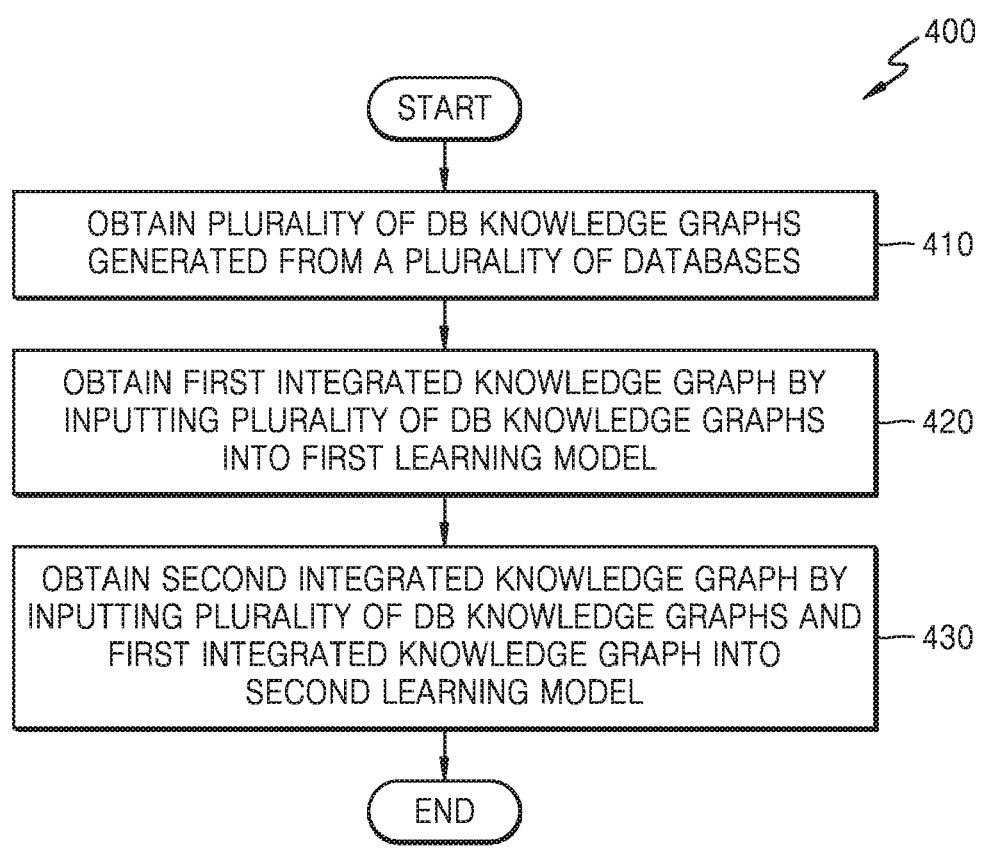
FIG. 4 is a flowchart of a method of obtaining an integrated knowledge graph from databases using a first learning model and a second learning model according to an embodiment of the disclosure.

FIG. 4 is a flowchart of a method of obtaining an integrated knowledge graph from databases using a first learning model and a second learning model according to an embodiment of the disclosure.

The method may be performed by the server 2000 shown in FIG. 1, the server 2000 shown in FIG. 2, or the server 2000 or a processor 2300 of the server 2000 shown in FIG. 15.

Operation 410 of FIG. 4 may correspond to operation 310 of FIG. 3. Operations 420 and 430 of FIG. 4 may correspond to operations 320 and 330 of FIG. 3, respectively.

Referring to FIG. 4, in operation 410, the server 2000 may obtain a plurality of knowledge graphs related to DBs generated from a plurality of databases. For example, the server 2000 may obtain a first knowledge graph generated based on a first database and a second knowledge graph generated based on a second database.

In operation 420, the server 2000 may obtain a first integrated knowledge graph by inputting the plurality of knowledge graphs related to DBs into a first learning model for determining a correlation between data fields constituting a plurality of databases. The server 2000 may obtain the first integrated knowledge graph by inputting the plurality of knowledge graphs related to DBs into the first learning model for determining a correlation between classes included in the plurality of knowledge graphs related to DBs.

The first learning model may be included in a learning model related to DB. The first learning model may be a learning model learning a criterion and a method, etc. for determining the correlation between the data fields included in the plurality of databases. The first learning model may provide a function of extracting classes in the knowledge graph related to DB corresponding to the data field of the database and deducing a correlation between the classes. In various embodiments of the disclosure, the first learning model may be an artificial intelligence algorithm which may be a learning model trained using at least one of machine learning, neural network, gene, deep learning, or a classification algorithm.

In various embodiments of the disclosure, the first integrated knowledge graph may include information about a correlation between data fields belonging to different databases.

In some embodiments of the disclosure, the correlation between the classes may be determined based on a type of a class, and the type may be identified based on an attribute of the class or a statistical distribution of instance values (which are in affiliation relation with the class) belonging to the class.

In various embodiments of the disclosure, the server 2000 may further input additional data into the first learning model, besides the plurality of knowledge graphs related to DBs. The additional data may be data that is independent of the databases, and may be predefined expert knowledge, external data, or the like. In some embodiments of the disclosure, the additional data may be knowledge graphs, or may be processed in the form of a knowledge graph and input into the first learning model. The first learning model may determine the correlation between the classes of the plurality of knowledge graphs related to DBs based on the additional data.

In some embodiments of the disclosure, the first integrated knowledge graph may include the entire plurality of knowledge graphs related to DBs as a subset. The first integrated knowledge graph may be generated by integrating and extending the plurality of knowledge graphs related to DBs. For example, the first integrated knowledge graph may be obtained by adding edges representing the correlation between the classes determined through the first learning model to the plurality of knowledge graphs related to DBs.

In other embodiments of the disclosure, the first integrated knowledge graph may only include information about the correlation between the classes. For example, the first integrated knowledge graph may include only classes which are determined as having the correlation through the first learning model among the plurality of knowledge graphs related to DBs and edges between the classes.

In operation 430, the server 2000 may obtain a second integrated knowledge graph by inputting the plurality of knowledge graphs related to DBs and the first integrated knowledge graph into the second learning model for determining correlation between data values constituting the plurality of databases. The server 2000 may obtain the second integrated knowledge graph by inputting the plurality of knowledge graphs related to DBs and the first integrated knowledge graph into the second learning model for determining correlation between instances included in the plurality of knowledge graphs related to DBs.

The second learning model may be included in the learning model related to DB. The second learning model may be a learning model learning a criterion and a method, etc. for determining the correlation between the data values included in the plurality of databases. The second learning model may provide a function of extracting instances in the knowledge graph related to DB corresponding to the data values of the database and deducing correlation between the instances. In various embodiments of the disclosure, the second learning model may be an artificial intelligence algorithm which may be a learning model trained using at least one of machine learning, neural network, gene, deep learning, or a classification algorithm.

In various embodiments of the disclosure, the second integrated knowledge graph may include information about correlation between data fields belonging to different databases.

In some embodiments of the disclosure, the second integrated knowledge graph may analyze correlation between instances belonging to the classes that are determined to have the correlation with each other. For example, when the first integrated knowledge graph includes information about a correlation between the first class included in the first knowledge graph related to the first DB and the second class included in the second knowledge graph related to the second DB, the second integrated knowledge graph may include an edge indicating a correlation between a first instance belonging to the first class and a second instance belonging to the second class.

In various embodiments of the disclosure, the server 2000 may further input additional data into the second learning model, besides the plurality of knowledge graphs related to DBs. The additional data may be data that is independent of the databases, and may be predefined expert knowledge, external data, or the like. In some embodiments of the disclosure, the additional data may be knowledge graphs, or may be processed in the form of the knowledge graph and input into the second learning model. The second learning model may determine the correlation between the instances of the plurality of knowledge graphs related to DBs based on the additional data.

In some embodiments of the disclosure, the second integrated knowledge graph may include the entire plurality of knowledge graphs related to DBs and the entire first integrated knowledge graph as a subset. The second integrated knowledge graph may be generated by integrating and extending the plurality of knowledge graphs related to DBs and the first integrated knowledge graph. For example, the second integrated knowledge graph may be obtained by adding edges representing the correlation between the classes determined through the first learning model and edges representing the correlation between the instances determined through the second learning model to the plurality of knowledge graphs related to DBs.

In other embodiments of the disclosure, the second integrated knowledge graph may only include information about the correlation between the classes and the instances. The second integrated knowledge graph may be generated by extending the first integrated knowledge graph. For example, the second integrated knowledge graph may include only the classes determined to have the correlation through the first learning model and the edges between the classes among the plurality of knowledge graphs related to DBs, the instances determined to have the correlation through the second learning model and the edges between the instances among the plurality of knowledge graphs related to DBs, and edges between the classes and the instances.

In various embodiments of the disclosure, the second integrated knowledge graph may be the same as an integrated knowledge graph of FIG. 3.

Figure 5:
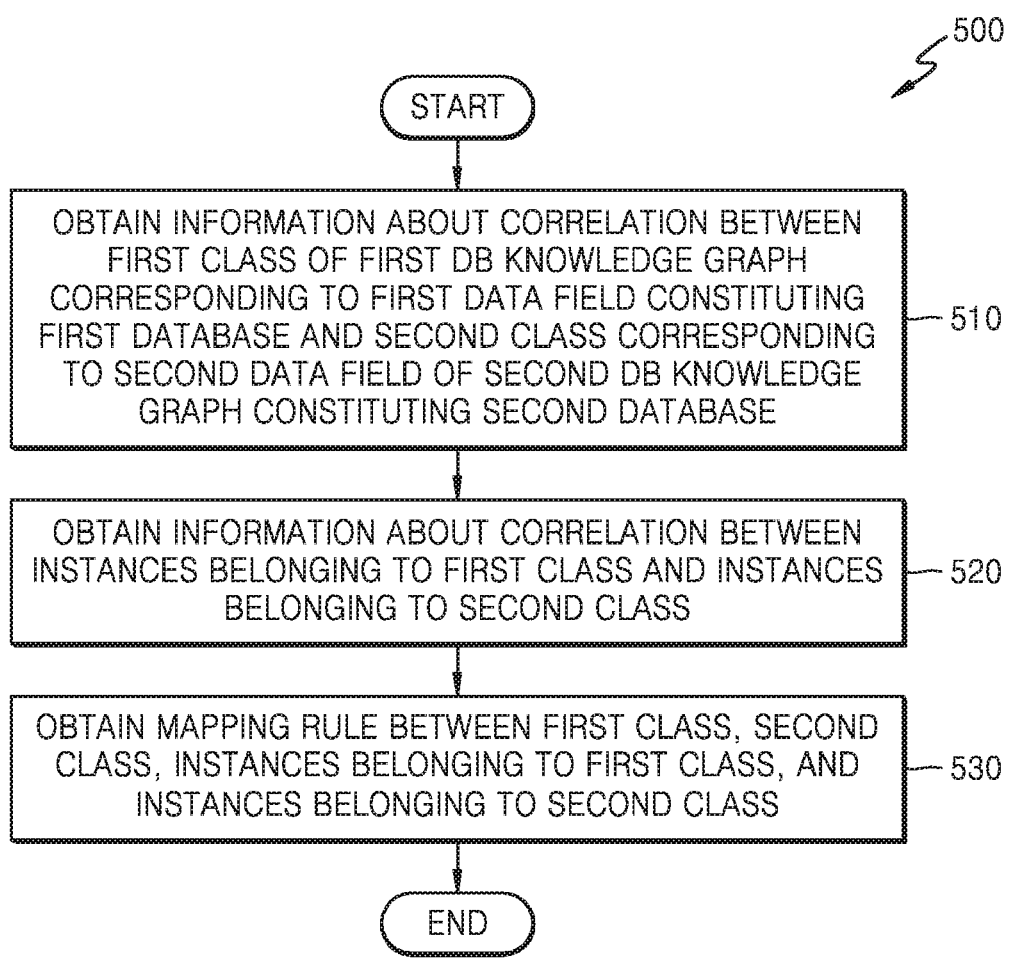
FIG. 5 is a flowchart of a method of obtaining information about a correlation between data in databases according to an embodiment of the disclosure.

FIG. 5 is a flowchart of a method of obtaining information about correlation between data in databases according to an embodiment of the disclosure.

The method may be performed by the server 2000 shown in FIG. 1, the server 2000 shown in FIG. 2, or the server 2000 or a processor 2300 of the server 2000 shown in FIG. 15.

FIG. 5 may be a flowchart of operation 330 of FIG. 3. Operations 510 to 530 of FIG. 5 may be performed after operation 320 of FIG. 3 is performed.

Referring to FIG. 5, in operation 510, the server 2000 may obtain information about a correlation between a first class of a first knowledge graph corresponding to a first data field constituting a first database and a second class corresponding to a second data field of a second knowledge graph constituting a second database. The server 2000 may obtain the information about the correlation between the first class and the second class from a learning model related to DB.

The information about the correlation between the first class and the second class may be included in an integrated knowledge graph. The integrated knowledge graph may include an edge representing the correlation between the first class and the second class. For example, the edge may indicate that the first class and the second class have the same relation (sameAs). This may mean that a first data field corresponding to the first class and a second data field corresponding to the second class represent the same data classification.

In various embodiments of the disclosure, the server 2000 may obtain the information about the correlation between the first class and the second class from a first learning model. In various embodiments of the disclosure, the information about the correlation between the first class and the second class may be included in a first integrated knowledge graph.

In some embodiments of the disclosure, the correlation between the classes may be determined based on a type of a class, and the type may be identified based on an attribute of the class. In some embodiments of the disclosure, the type may be identified based on a statistical distribution of instance values (which are in affiliation relation with the class) belonging to the class.

In operation 520, the server 2000 may obtain information about correlation between instances belonging to the first class and instances belonging to the second class. The server 2000 may obtain the information about the correlation between the instances belonging to the first class and the instances belonging to the second class from the learning model related to DB.

The information about the correlation between the instances belonging to the first class and the instances belonging to the second class may be included in the integrated knowledge graph. The integrated knowledge graph may include an edge indicating a correlation between a first instance belonging to the first class and a second instance belonging to the second class. For example, the edge may indicate that the first instance and the second instance have the same relation (sameAs). This may mean that a first data value of the first database corresponding to the first instance and a second data value of the second database corresponding to the second instance are information of the same meaning.

In various embodiments of the disclosure, the server 2000 may obtain the information about the correlation between the instances belonging to the first class and the instances belonging to the second class from a second learning model. In various embodiments of the disclosure, the information about the correlation between the instances belonging to the first class and the instances belonging to the second class may be included in a second integrated knowledge graph.

In operation 530, the server 2000 may obtain a mapping rule between the first class, the second class, the instances belonging to the first class, and the instances belonging to the second class. The mapping rule may be a rule for integrating or linking a plurality of databases having different structures and formats. In various embodiments of the disclosure, the mapping rule may be included in the integrated knowledge graph.

In various embodiments of the disclosure, the mapping rule may define a correspondence correlation and/or a conversion rule between data values belonging to data fields having correlation. In some embodiments of the disclosure, when the first instance and the second instance have the same relation with each other, the mapping rule may be defined such that a data value corresponding to the first instance and a data value corresponding to the second instance correspond to each other. In some embodiments of the disclosure, when the first class and the second class have the same relation with each other while the instance belonging to the first class and the instance belonging to the second class have different data formats, the mapping rule may be collectively defined based on a data format.

Figure 6:
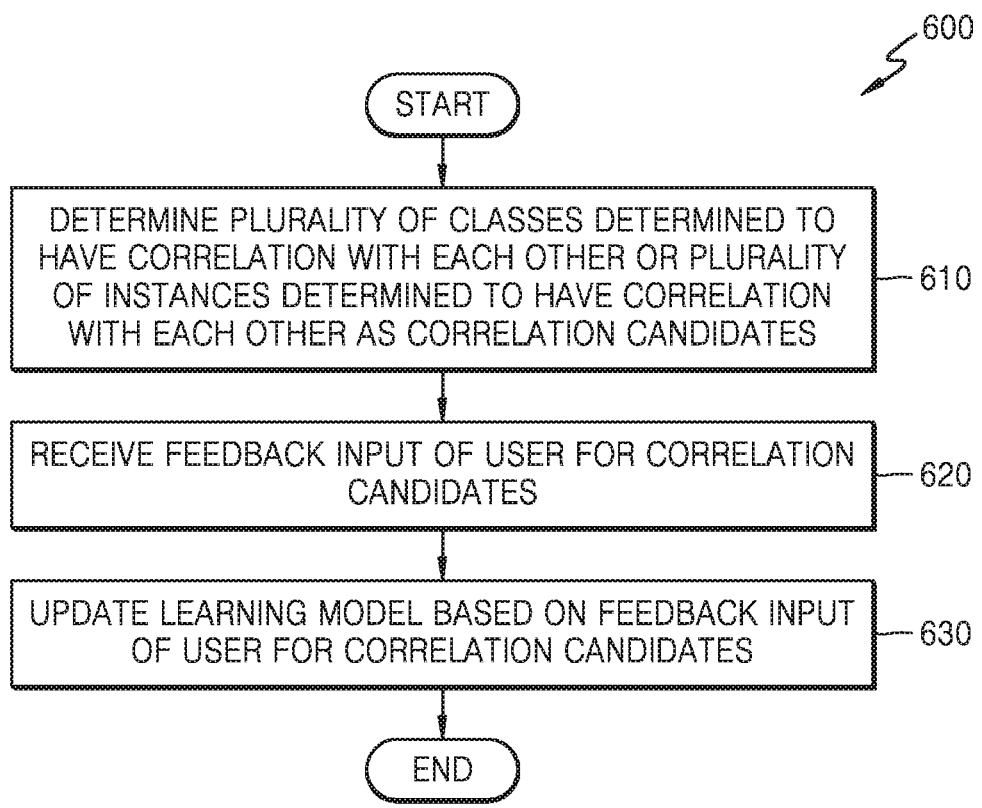
FIG. 6 is a flowchart of a method of updating a learning model based on a feedback input of a user according to an embodiment of the disclosure.

FIG. 6 is a flowchart of a method of updating a learning model based on a feedback input of a user according to an embodiment of the disclosure.

The method may be performed by the server 2000 shown in FIG. 1, the server 2000 shown in FIG. 2, or the server 2000 or a processor 2300 of the server 2000 shown in FIG. 15.

FIG. 6 may be a flowchart of operation 330 of FIG. 3. Operations 610 to 630 of FIG. 6 may be performed after operation 320 of FIG. 3 is performed.

Referring to FIG. 6, in operation 610, the server 2000 may determine a plurality of classes determined to have a correlation with each other among classes included in a plurality of knowledge graphs related to DBs or a plurality of instances determined to have correlation with each other among instances included in the plurality of knowledge graphs related to DBs as correlation candidates, and request the feedback input of the user to the correlation candidates. The correlation candidates may be determined in a process of obtaining an integrated knowledge graph by a learning model.

For example, when it is determined by the learning model that a first class and a second class have the same relation, the server 2000 may request the user to confirm whether the first class and the second class have the same relation.

The server 2000 may transmit a feedback input request to the device 1000. Alternatively, the server 2000 may output the feedback input request through an output unit of the server 2000.

In operation 620, the server 2000 may receive the feedback input of the user for the correlation candidates.

When the server 2000 transmits the feedback input request to the device 1000, the server 2000 may receive the feedback input of the user from the device 1000 for the correlation candidates. When the server 2000 outputs the feedback input request through the output unit of the server 2000, the server 2000 may receive the feedback input of the user to the correlation candidates through an input unit of the server 2000.

In operation 630, the server 2000 may update the learning model based on the feedback input of the user for the correlation candidates. For example, when the feedback input of the user is to approve that the first class and the second class have the same relation, the learning model may not request the feedback from the user for another class having the same or similar characteristics as the first class or the second class but may determine that the other class has the same relation as the first class and the second class.

Figure 7:
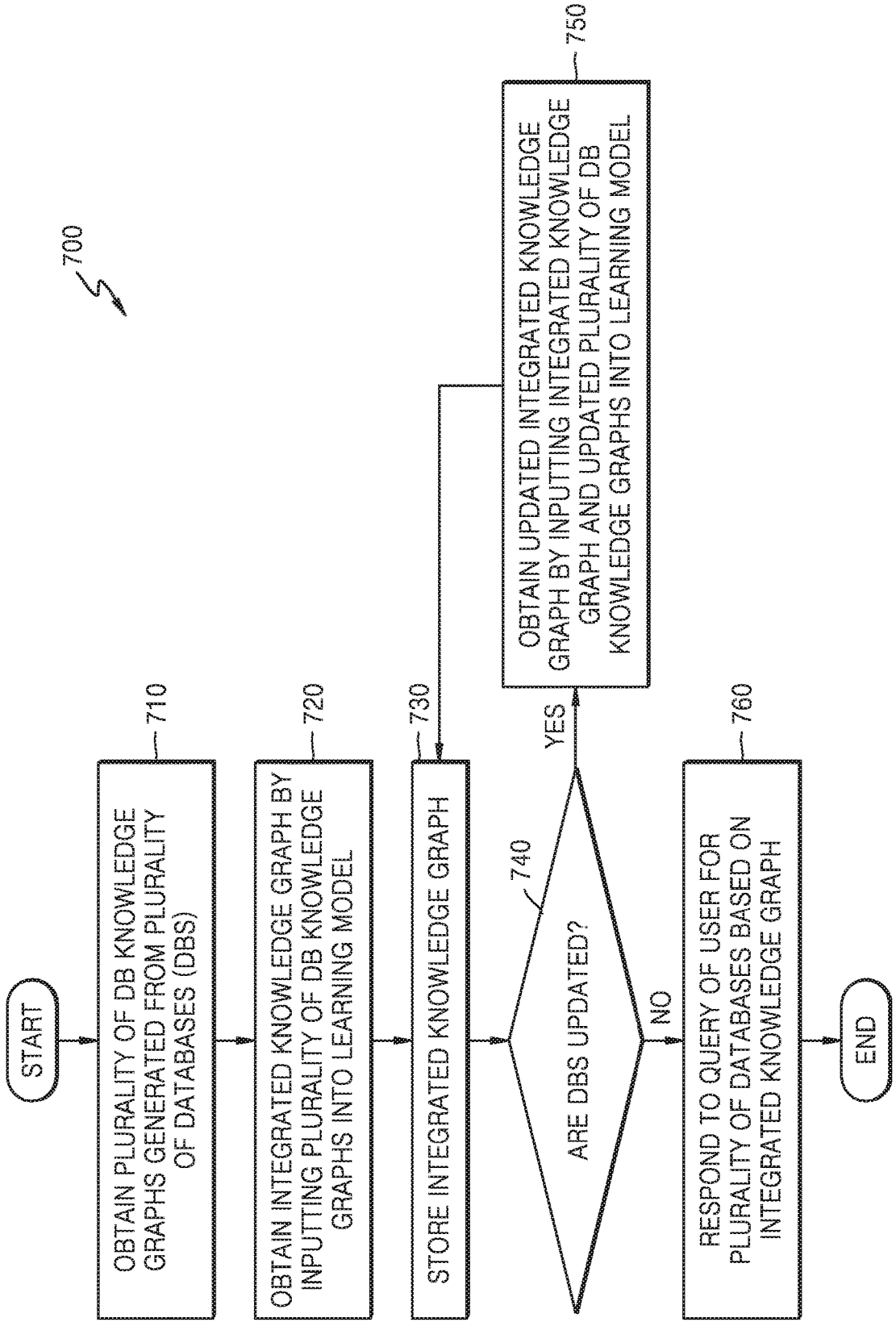
FIG. 7 is a flowchart of a method of responding to a query of a user for a plurality of databases using an integrated knowledge graph according to an embodiment of the disclosure.

FIG. 7 is a flowchart of a method of responding to a query of a user for a plurality of databases using an integrated knowledge graph according to an embodiment of the disclosure.

The method may be performed by the server 2000 shown in FIG. 1, the server 2000 shown in FIG. 2, or the server 2000 or a processor 2300 of the server 2000 shown in FIG. 15.

Referring to FIG. 7, in operation 710, the server 2000 may obtain a plurality of knowledge graphs related to DBs generated from a plurality of databases (DBs). In operation 720, the server 2000 may obtain the integrated knowledge graph by inputting the plurality of knowledge graphs related to DBs into a learning model. Operations 710 and 720 of FIG. 7 may be performed after operations 310 and 320 of FIG. 3 are performed.

In operation 730, the server 2000 may store the obtained integrated knowledge graph. The server 2000 may store the integrated knowledge graph in a storage device of a server itself or in another external storage device. The server 2000 may store the integrated knowledge graph such that the integrated knowledge graph is available by the device 1000, the database server 3000, or the server 2000 itself. The server 2000 may store the integrated knowledge graph such that the integrated knowledge graph may be accessible and available by applications and devices that use the original database. The server 2000 may store the integrated knowledge graph separately from databases and knowledge graphs related to DBs.

In operation 740, the server 2000 may determine whether the plurality of databases are updated. When it is determined that there is at least one updated database among the plurality of databases, the server 2000 may perform operation 750. Alternatively, when the plurality of databases are not updated, the server 2000 may perform operation 760.

In operation 750, the server 2000 may obtain an updated integrated knowledge graph by inputting the integrated knowledge graph and the updated plurality of knowledge graphs related to DBs generated from the updated plurality of databases into the learning model. In various embodiments of the disclosure, the server 2000 may reflect updates of the plurality of databases to the integrated knowledge graph in real time to obtain the updated integrated knowledge graph.

In some embodiments of the disclosure, the server 2000 may receive an updated database from the database server 3000 and generate an updated knowledge graph related to DB corresponding thereto. In other embodiments of the disclosure, the server 2000 may receive the updated knowledge graph corresponding to the updated database from the database server 3000.

In various embodiments of the disclosure, the learning model may extract a new node that is not included in the integrated knowledge graph among the updated knowledge graph and determine a new correlation between the new node and a node included in the integrated knowledge graph. The learning model may add the new node and an edge representing the new correlation to the integrated knowledge graph to generate the updated integrated knowledge graph.

When the updated integrated knowledge graph is obtained, the server 2000 may perform operation 730. The server 2000 may store the updated integrated knowledge graph.

In operation 760, the server 2000 may respond to a query of a user for the plurality of databases based on the stored integrated knowledge graph. The server 2000 may receive the query of the user from the device 1000, generate a response message for the query, and transmit the response message to the device 1000.

Figure 8:
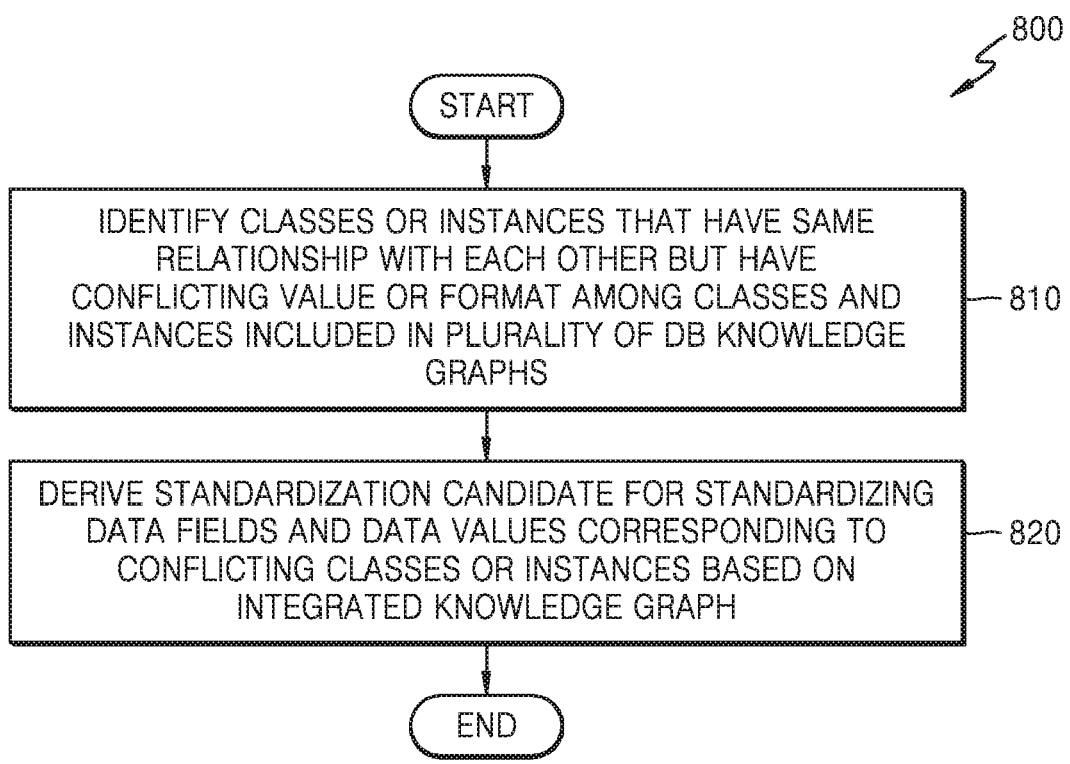
FIG. 8 is a flowchart of a method of recognizing conflict existing between a plurality of databases and standardizing conflicting data according to an embodiment of the disclosure.

FIG. 8 is a flowchart of a method of recognizing conflict existing between a plurality of databases and standardizing conflicting data according to an embodiment of the disclosure.

The method may be performed by the server 2000 shown in FIG. 1, the server 2000 shown in FIG. 2, or the server 2000 or a processor 2300 of the server 2000 shown in FIG. 15.

Referring to FIG. 8, in operation 810, the server 2000 may identify the conflict between data include in the plurality of databases based on an integrated knowledge graph. The server 2000 may identify classes or instances that have the same relation with each other but have a conflicting value or format among classes and instances included in the integrated knowledge graph.

For example, while both a first class and a second class included in the integrated knowledge graph are classes of a 'country code' type and have the same relation with each other, when the first class and the second class are different in that a label of the first class is 'COUNTRY_CODE' and a label of the second class is 'H_COUNTRYCODE', the server 2000 may identify the first class and the second class as conflicting classes.

For another example, while both a first instance belonging to the first class and a second instance belonging to the second class are instances of a 'Korean country code' type and have the same relation with each other, when the first instance and the second instance are different in that a value of the first instance is 'KOR' and a value of the second instance is 'KR', the server 2000 may identify the first instance and the second instance as conflicting instances, and may further classify the first class and the second class as the conflicting classes.

For another example, while both a third class and a fourth class included in the integrated knowledge graph are classes of a 'date' type and have the same relation with each other, when the third class and the fourth class are different in that values of instances belonging to the third class are in the form of dd/Mon/yyyy and values of instances belonging to the fourth class are in the form of yy-mm-dd, the server 2000 may identify the third class and the fourth class as conflicting classes.

In operation 820, the server 2000 may derive a standardization candidate for standardizing conflicting data fields and data values. The server 2000 may derive the standardization candidate among the conflicting classes or instances based on the integrated knowledge graph.

The server 2000 may derive the standardization candidate based on importance, utilization rate, representativeness, and/or trends. For example, in the example of the first class and the second class, the server 2000 may derive 'KOR' as the standardization candidate for 'Korean country code', based on the most cases of using 'KOR' among the instances of 'Korean country code' type.

In various embodiments of the disclosure, the server 2000 may store the derived standardization candidate. The server 2000 may determine whether a database conforms to the standard based on the standardization candidate when the database is updated and/or when a new database is added. When it is determined that the database does not conform to the standard, the server 2000 may provide a user with a standardization proposal based on the standardization candidate.

Figure 9A:
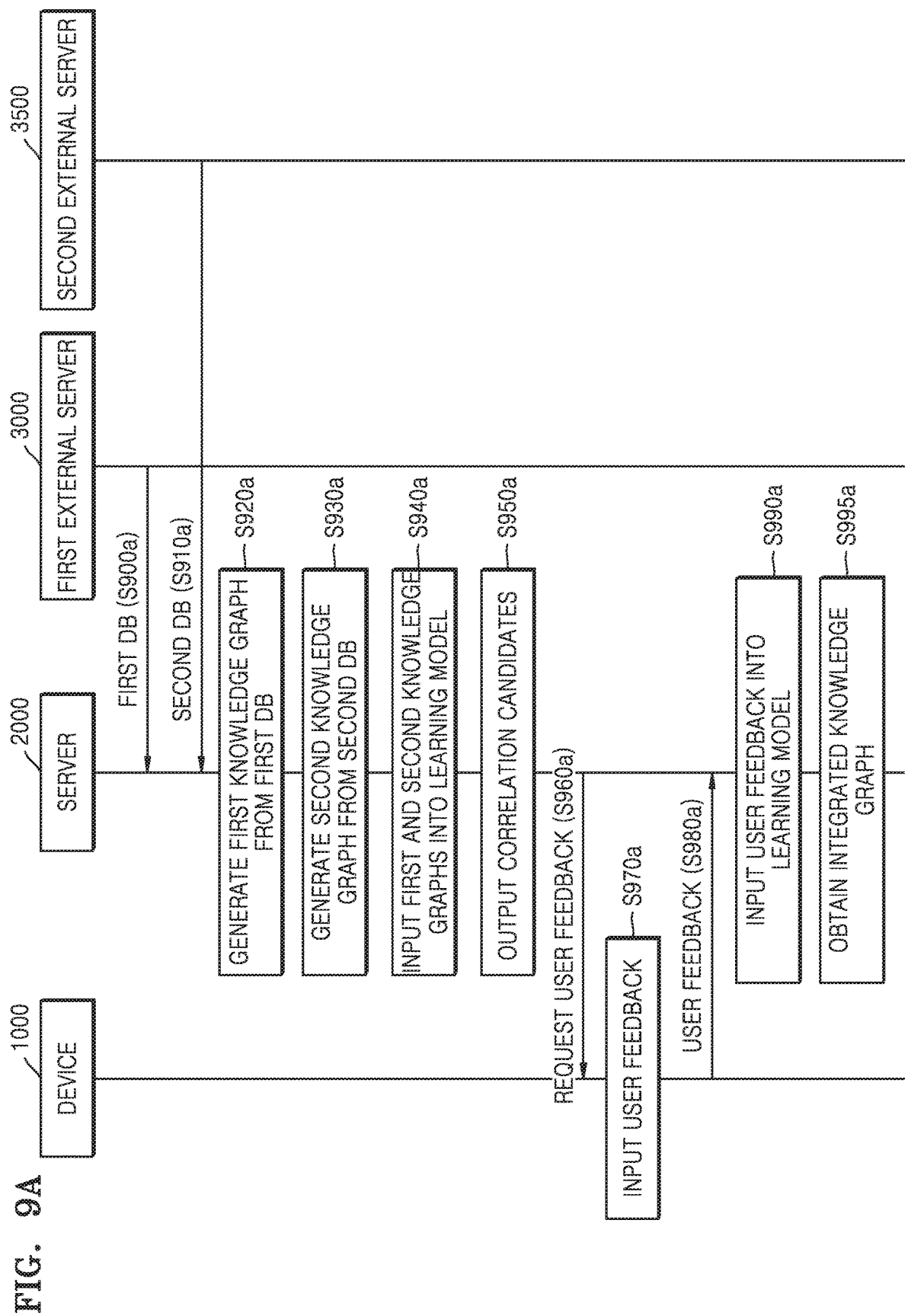
FIG. 9A is a diagram illustrating a method, performed by a system, of obtaining an integrated knowledge graph from databases using a learning model according to an embodiment of the disclosure.

FIG. 9A is a diagram illustrating a method, performed by a system, of obtaining an integrated knowledge graph from databases using a learning model according to an embodiment of the disclosure.

Referring to FIG. 9A, in operation S900a, the server 2000 may receive a first database from the first external server 3000. In operation S910a, the server 2000 may receive a second database from a second external server 3500. The second database may be used by an application or a device different from the first database, and may have a different structure or format from the first database.

The first external server 3000 and the second external server 3500 may be physically or logically distinguished separate servers or may be the same server.

In operation S920a, the server 2000 may generate a first knowledge graph related to DB from the received first database. In operation S930a, the server 2000 may generate a second knowledge graph related to DB from the received second database.

In operation S940a, the server 2000 may input the first knowledge graph and the second knowledge graph into a learning model related to DB for determining a correlation between data included in the first database and data included in the second database.

According to some embodiments of the disclosure, the learning model related to DB may include a first learning model for determining correlation between data fields constituting a plurality of databases and a second learning model for determining correlation between data values included in the plurality of databases.

In operation S950a, the server 2000 may determine a plurality of classes determined to have correlation with each other among classes included in a plurality of knowledge graphs related to DBs or a plurality of instances determined to have correlation with each other among instances included in the plurality of knowledge graphs related to DBs as correlation candidates. The correlation candidate may be determined by the learning model related to DB.

In operation S960a, the server 2000 may transmit a feedback input request of a user for the correlation candidates to the device 1000. In operation S970a, the device 1000 may receive a feedback input of the user for the correlation candidates. In operation S980a, the server 2000 may receive the feedback input of the user to the correlation candidates from the device 1000.

In operation S990a, the server 2000 may input the feedback input of the user for the correlation candidates into the learning model related to DB. The server 2000 may update the learning model based on the feedback input of the user for the correlation candidates.

In operation S995a, the server 2000 may obtain the integrated knowledge graph including information about the correlation output from the learning model related to DB and extracted from the plurality of knowledge graphs related to DBs.

The integrated knowledge graph may include information about correlation between data included in different databases. The integrated knowledge graph may include an edge representing correlation between nodes included in different knowledge graphs related to DBs. For example, the integrated knowledge graph may include an edge representing a correlation between a first class of the first knowledge graph and a second class of the second knowledge graph. For example, the integrated knowledge graph may include an edge representing a correlation between a first instance of the first knowledge graph and a second instance of the second knowledge graph.

Figure 9B:
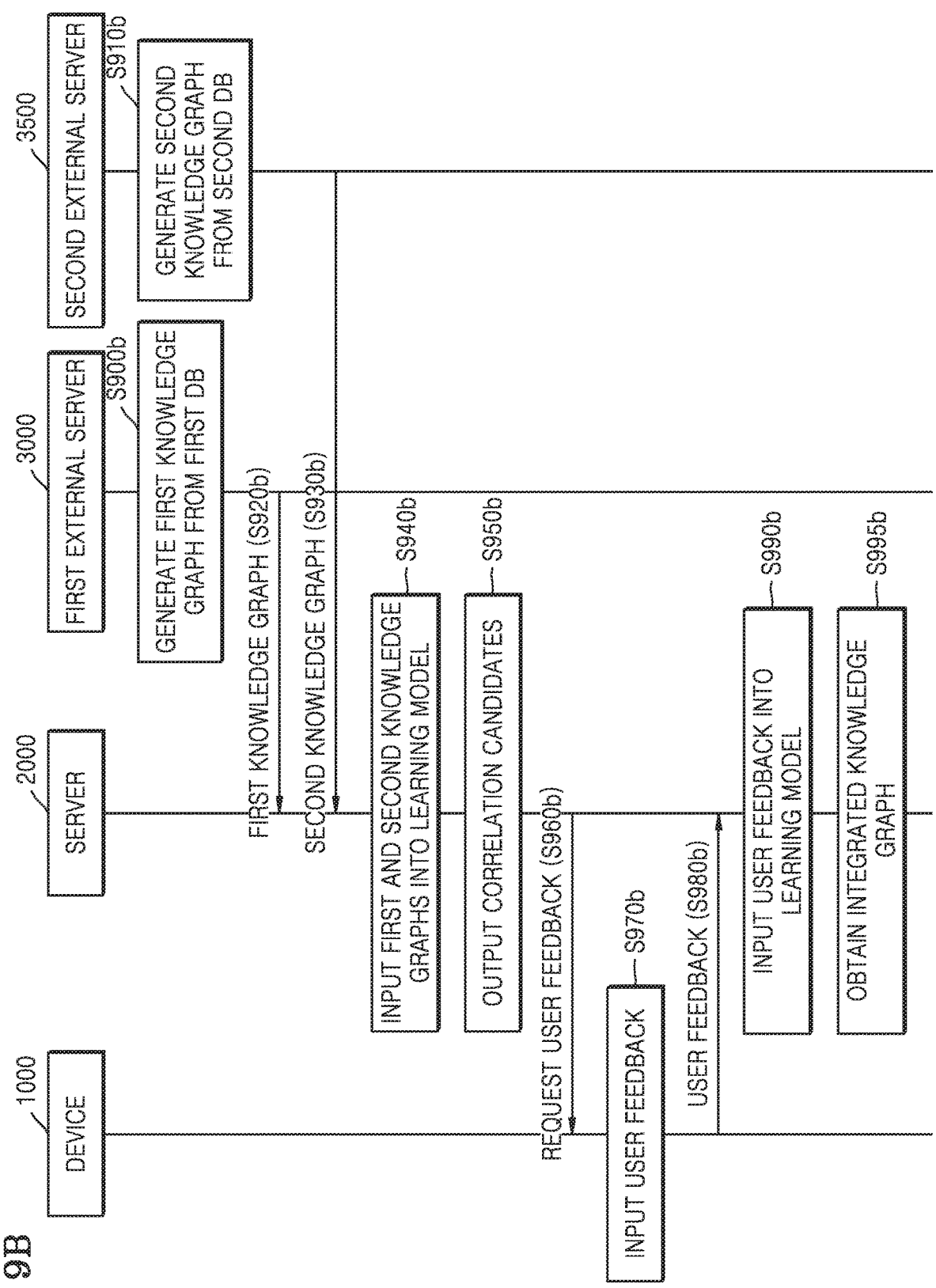
FIG. 9B is a diagram illustrating a method, performed by a system, of obtaining an integrated knowledge graph from databases using a learning model according to an embodiment of the disclosure.

FIG. 9B is a diagram illustrating a method, performed by a system, of obtaining an integrated knowledge graph from databases using a learning model according to an embodiment of the disclosure.

Referring to FIG. 9B, in operation S900b, the first external server 3000 may generate a first knowledge graph related to DB from a first database. In operation S910b, the second external server 3500 may generate a second knowledge graph related to DB from a second database. The first external server 3000 and the second external server 3500 may be physically or logically distinguished separate servers or may be the same server.

The first database and the second database may be stored in the first external server 3000 and the second external server 3500, respectively, and may be transmitted from a third server (not shown) to the first external server 3000 and the second external server 3500 respectively. The first database and the second database may be used by different applications or devices, and may have different structures or formats.

In operation S920b, the server 2000 may receive the first knowledge graph from the first external server 3000. In operation S930b, the server 2000 may receive the second knowledge graph from the second external server 3500.

Operations S940b through S995b in FIG. 9B may correspond to operations S940a through S995a in FIG. 9A respectively.

The above-described embodiments of the disclosure describe a method of obtaining an integrated knowledge graph by inputting a plurality of knowledge graphs related to DBs into a learning model related to DB, but the disclosure is not necessarily limited thereto. The server 2000 may obtain the integrated knowledge graph including correlation between the original databases directly without converting the original databases into knowledge graphs related to DBs by inputting the original databases into the learning model related to DB. Those of ordinary skill in the art will appreciate that the embodiments described above may be modified and applied to obtain the integrated knowledge graph directly from the original databases.

Figure 10A:
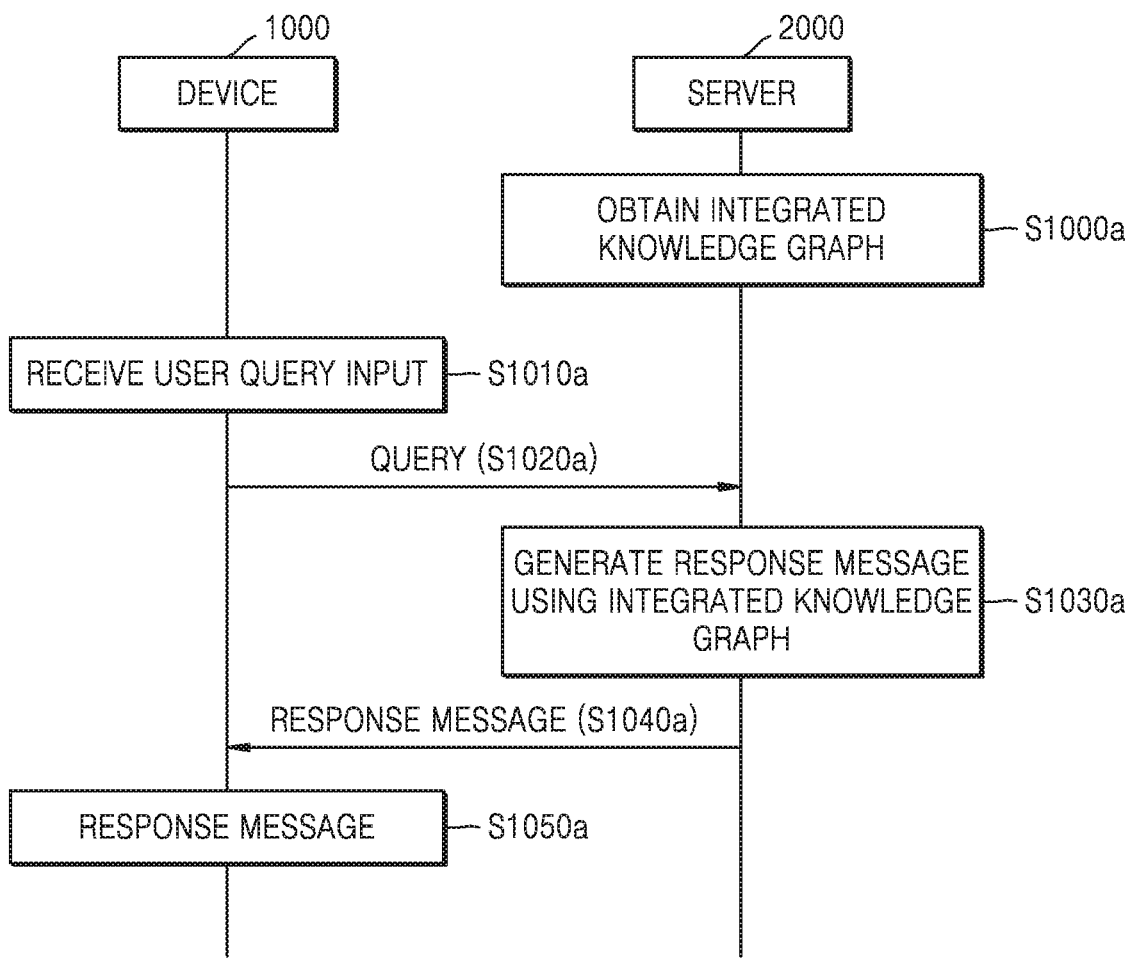
FIG. 10A is a diagram illustrating a method, performed by a system, of responding to a query of a user for a plurality of databases using an integrated knowledge graph according to an embodiment of the disclosure.

FIG. 10A is a diagram illustrating a method, performed by a system, of responding to a query of a user for a plurality of databases using an integrated knowledge graph according to an embodiment of the disclosure.

Referring to FIG. 10A, in operation S1000a, the server 2000 may obtain the integrated knowledge graph representing correlation between data in the plurality of databases, based on the plurality of databases. The integrated knowledge graph may be obtained by a method described in FIGS. 3 to 7 and 9A, and 9B. The server 2000 may obtain a plurality of knowledge graphs related to DBs generated from the plurality of databases and input the plurality of knowledge graphs related to DBs into a learning model related to DB for determining the correlation between the data in the plurality of databases, thereby obtaining the integrated knowledge graph including information about the correlation extracted from the plurality of knowledge graphs related to DBs.

In operation S1010a, the device 1000 may receive a query input of a user for the plurality of databases. In various embodiments of the disclosure, the query entry may include, but is not limited to, text, handwriting, image, or speech. In some embodiments of the disclosure, the query entry may include an abstract expression that does not correspond to a structure and a format of a specific database. In some embodiments of the disclosure, the query input may be in the form of a natural language.

In operation S1020a, the device 1000 may transmit the query of the user to the server 2000 based on the query input. In some embodiments of the disclosure, the device 1000 may analyze the query input to extract a query that may be applied to the knowledge graph. In various embodiments of the disclosure, the query may include querying a location of specific data in the plurality of databases, retrieving data of a specific condition, or obtaining statistics of data of a specific condition, but the disclosure is not limited thereto.

In operation S1030a, the server 2000 may generate a response message to the query of the user using the above-described integrated knowledge graph. In various embodiments of the disclosure, the server 2000 may generate the response message for the query using only the integrated knowledge graph. In some embodiments of the disclosure, the server 2000 may analyze the query of the user to extract a query language for the integrated knowledge graph. The server 2000 may generate the response message based on response data of the integrated knowledge graph for the query language.

In operation S1040a, the server 2000 may transmit the generated response message to the device 1000. In operation S1050a, the device 1000 may output the response message received from the server 2000.

FIG. 10B is a diagram illustrating another method, performed by a system, of responding to a query of a user for a plurality of databases using an integrated knowledge graph according to an embodiment of the disclosure.

Referring to FIG. 10B, in operation S1000b, the server 2000 may obtain the integrated knowledge graph representing correlation between data in the plurality of databases, based on the plurality of databases. The integrated knowledge graph may be obtained by a method described in FIGS. 3 to 7 and 9A, and 9B. The server 2000 may obtain a plurality of knowledge graphs related to DBs generated from the plurality of databases and input the plurality of knowledge graphs related to DBs into a learning model related to DB for determining the correlation between the data in the plurality of databases, thereby obtaining the integrated knowledge graph including information about the correlation extracted from the plurality of knowledge graphs related to DBs.

In operation S1010b, the device 1000 may receive a query input of a user for the plurality of databases. In various embodiments of the disclosure, the query entry may include, but is not limited to, text, handwriting, image, or speech. In some embodiments of the disclosure, the query entry may include an abstract expression that does not correspond to a structure and a format of a specific database. In some embodiments of the disclosure, the query input may be in the form of a natural language.

In operation S1020b, the device 1000 may transmit the query of the user to the server 2000 based on the query input. In some embodiments of the disclosure, the device 1000 may analyze the query input to extract a query that may be applied to the knowledge graph. In various embodiments of the disclosure, the query may include querying a location of specific data in the plurality of databases, retrieving data of a specific condition, or obtaining statistics of data of a specific condition, but the disclosure is not limited thereto.

In operation S1030b, the server 2000 may request response data for the query from the first external server 3000 by using the integrated knowledge graph. For example, the server 2000 may analyze the query of the user to extract a query language for a first database of the first external server 3000. In operation S1035b, the server 2000 may request the response data for the query from the second external server 3500 by using the integrated knowledge graph. For example, the server 2000 may analyze the query of the user to extract a query language for a second database of the second external server 3500.

In operation S1040b, the server 2000 may receive the response data from the first external server 3000. The response data may be response data for the query language for the first database of the first external server 3000. In operation S1045b, the server 2000 may receive the response data from the second external server 3500. The response data may be response data for the query language for the second database of the second external server 3500.

In operation S1050b, the server 2000 may generate a response message from the response data using the integrated knowledge graph. In operation S1060a, the server 2000 may transmit the generated response message to the device 1000. In operation S1070a, the device 1000 may output the response message received from the server 2000.

Figure 10C:
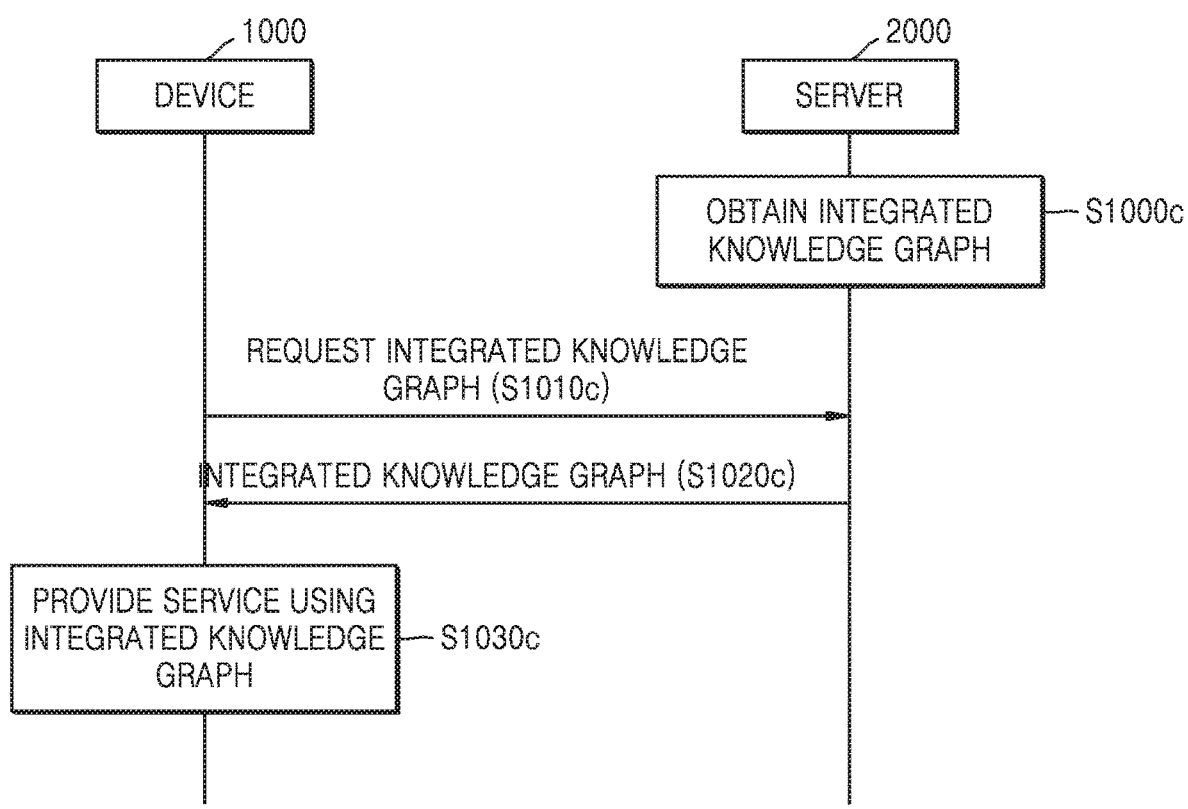
FIG. 10C is a diagram illustrating a method, performed by a system, of responding to a query of a user for a plurality of databases using an integrated knowledge graph according to an embodiment of the disclosure.

FIG. 10C is a diagram illustrating a method, performed by a system, of providing a service using an integrated knowledge graph according to an embodiment of the disclosure.

Referring to FIG. 10C, in operation S1000c, the server 2000 may obtain the integrated knowledge graph representing correlation between data in the plurality of databases, based on the plurality of databases. The integrated knowledge graph may be obtained by a method described in FIGS. 3 to 7 and 9A, and 9B. The server 2000 may obtain a plurality of knowledge graphs related to DBs generated from the plurality of databases and input the plurality of knowledge graphs related to DBs into a learning model related to DB for determining the correlation between the data in the plurality of databases, thereby obtaining the integrated knowledge graph including information about the correlation extracted from the plurality of knowledge graphs related to DBs.

In operation S1010c, the device 1000 may request the integrated knowledge graph from the server 2000. The device 1000 may request the integrated knowledge graph from the server 2000 while transmitting information related to the service to use the integrated knowledge graph to the server 2000. The information related to the service may include information related to an application providing the service, information related to a database related to the service, and information related to a device and a user to be provided with the service.

In operation S1020c, the device 1000 may receive the generated integrated knowledge graph from the server 2000. The server 2000 may transmit the entire integrated knowledge graph to the device 1000. The server 2000 may transmit only a part of the integrated knowledge graph necessary for the service based on the information related to the service.

In operation S1030c, the device 1000 may provide the service to the user using the received integrated knowledge graph. For example, the device 1000 may respond to a query of the user for a plurality of databases using the received integrated knowledge graph.

FIG. 11 is a diagram illustrating databases and knowledge graphs related to DBs according to an embodiment of the disclosure.

Referring to FIG. 11, a specific method of obtaining a knowledge graph related to a DB from a database will be described below.

The database may include data fields representing classification of data. The databases may include data values that are values corresponding to the data fields.

For example, a first database 3001 may include data fields, such as 'IP', 'IP_COUNTRY', 'DATE', 'GUID', etc., and data values, such as '123.456.78.9', 'United States', '20180114', '1', etc.

The knowledge graph related to DB may be a knowledge graph generated based on a database. The knowledge graph related to DB may be generated based on a schema and data of the database, and may include a location of the database, a structure of the database, and a correlation between the data.

Each knowledge graph related to DB may include a node corresponding to a data field and a data value in the database, and an edge corresponding to a correlation between the nodes. The node of the knowledge graph may include a class corresponding to the data field of the database and an instance corresponding to the data value. In this case, the edge of the knowledge graph may represent correlation between data fields (between a class and a class), between data values (between an instance and an instance), or between a data field and a data value (between a class and an instance).

A correlation may represent a method of relating a pair of nodes, corresponding to a pair of data, to each other in a knowledge graph. In various embodiments of the disclosure, the correlation may be represented by a predicate with a pair of data/node as a subject and an object, respectively. For example, the correlation may include the same relation (sameAs), an affiliation relation (type), or an inclusion relation (subClassOf), etc., but the disclosure is not limited thereto. The correlation may be a one-way relation, such as the affiliation relation or the inclusion relation, or may be a two-way relation, such as the same relation.

The first knowledge graph 3011 is an example of a knowledge graph generated based on the first database 3001, only a part thereof is shown. The node is shown as a vertex (node), and an edge is shown as a line (side) connecting vertices.

For example, a first data field 'IP_COUNTRY' constituting the first database may correspond to a first class of the first knowledge graph, i.e., a node indicated as 'IP_COUNTRY'. A first data value 'United State' included in the first database may correspond to a first instance of the first knowledge graph, i.e., a node indicated as 'United States'.

When the first data value of the first database belongs to the first data field, the first knowledge graph may include an edge indicating that the first instance is the affiliation relation (type) for the first class. The edge may be visualized as a line connecting the first instance and the first class.

As described above, the knowledge graph related to DB may be generated from each database by using a method of mapping data fields and data values of the database to classes and instances of the knowledge graph related to DB, respectively.

Figure 12:
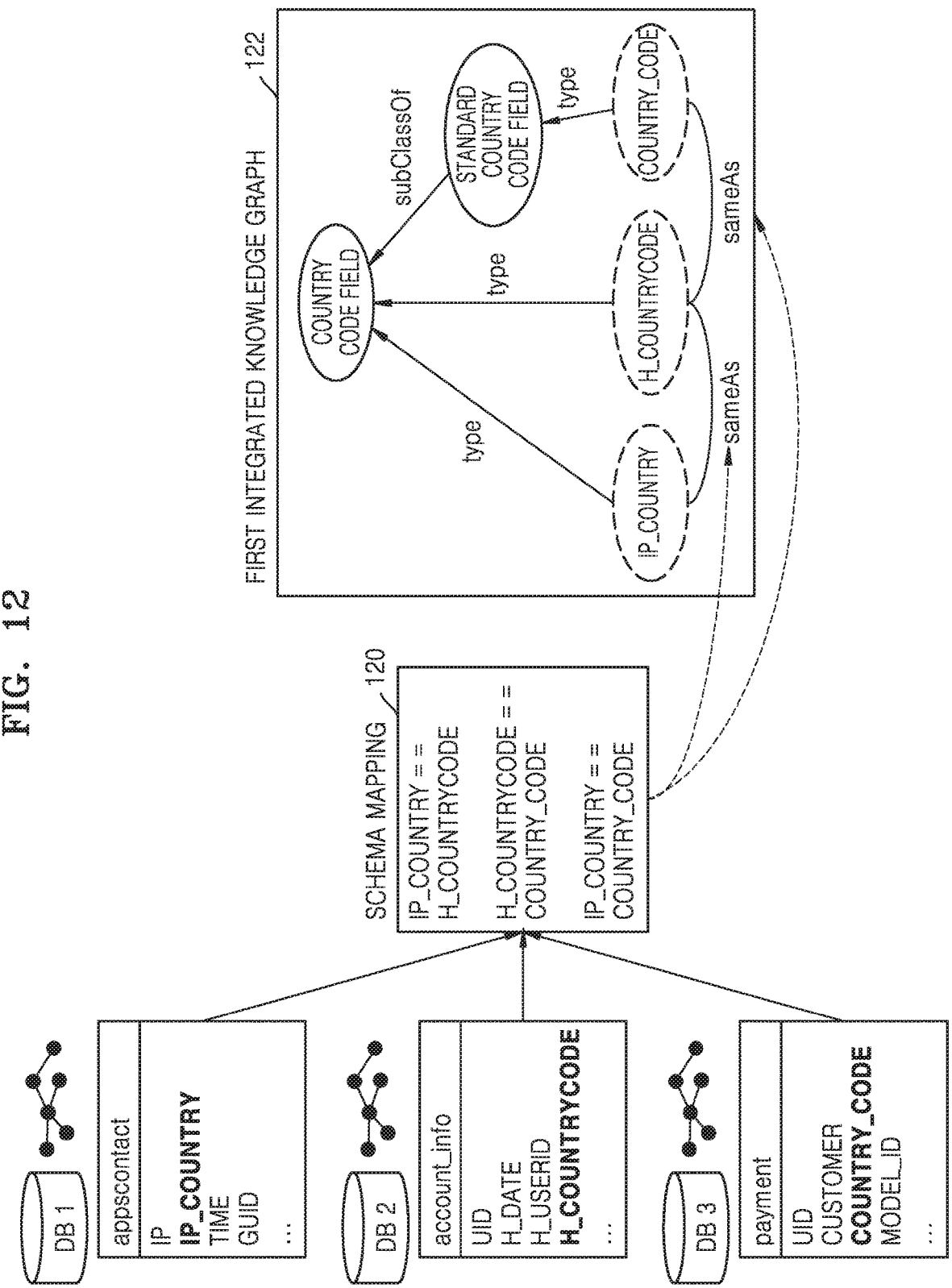
FIG. 12 is a diagram illustrating a method of generating a first integrated knowledge graph representing a correlation between data fields according to an embodiment of the disclosure.

FIG. 12 is a diagram illustrating a method of generating a first integrated knowledge graph representing correlation between data fields according to an embodiment of the disclosure.

Referring to FIG. 12, a specific method performed by a first learning model of determining the correlation between the data fields is described.

For example, tables shown with a first database DB 1, a second database DB 2 and a third database DB 3 represent data fields constituting each database. For example, a first database may include data fields, such as 'IP', 'IP_COUN-TRY', 'DATE', 'GUID', etc., and the data fields may correspond to classes of a first knowledge graph. Likewise, data fields of a second database and a third database may correspond to classes of a second knowledge graph and a third knowledge graph, respectively.

The first learning model may receive the knowledge graphs related to DBs to analyze correlation between the data fields or classes corresponding to the data fields.

In some embodiments of the disclosure, the correlation between the classes may be determined based on a type of a class, and the type may be identified based on an attribute of the class. The attribute may include a label, a data type, a super class, a sub class, a comment or etc., but the disclosure is not limited thereto.

In some embodiments of the disclosure, the type may be identified based on a statistical distribution of instance values belonging to the class (which are in affiliation relation with the class). The statistical distribution may include quantitative values, such as range, mean, median, deviation, or frequency, etc. and qualitative assessments, such as similarity and regularity of the instance values.

For example, the first learning model may determine that a first class corresponding to a data field 'IP_COUNTRY' of the first database DB1, a second class corresponding to a data field 'H_COUNTRYCODE' of the second database DB2, and a third class corresponding to a data field 'COUN-TRY_CODE' of the third database DB3 are in the same relation with each other, as illustrated in schema mapping 120.

Determination that the classes are in the same relation may be based on the fact that types of the classes are the same as a 'country code field'. The type may be identified based on an attribute of the class. For example, the first learning model may identify that the class is the 'country code field' type based on the fact that the label of the first class is 'IP_COUNTRY'. Alternatively, for example, the first learning model may identify that the second class is the 'country code field' type based on the fact that instance values belonging to the second class constitute a set, such as {US, KR, CN, UK, CA, . . . }

In addition to a plurality of knowledge graphs related to DBs, predefined standard country code information may be input to the first learning model as additional data. The first learning model may determine correlation between classes of the knowledge graphs related to DBs based on the standard country code information. For example, the first learning model may identify that the third class is a 'standard country code field' type, based on the fact that the standard country code information and instance values belonging to the third class are similar.

The first learning model may generate a first integrated knowledge graph based on information indicating the correlation between the classes. For example, the first learning model may generate a first integrated knowledge graph 122 including edges (sameAs) representing that the first class corresponding to 'IP_COUNTRY' of the first database DB1, the second class corresponding to the 'H_COUNTRY-CODE' data field of the second database DB2, and the third class corresponding to the 'COUNTRY_CODE' data field of the third database DB3 are in the same relation, based on the determination that the classes are in the same relation.

The first integrated knowledge graph may also include information about the types of the classes. For example, the first integrated knowledge graph may include edges (type) representing that the first class, the second class, and the third class are in affiliation relation with the 'country code field' class.

Figure 13:
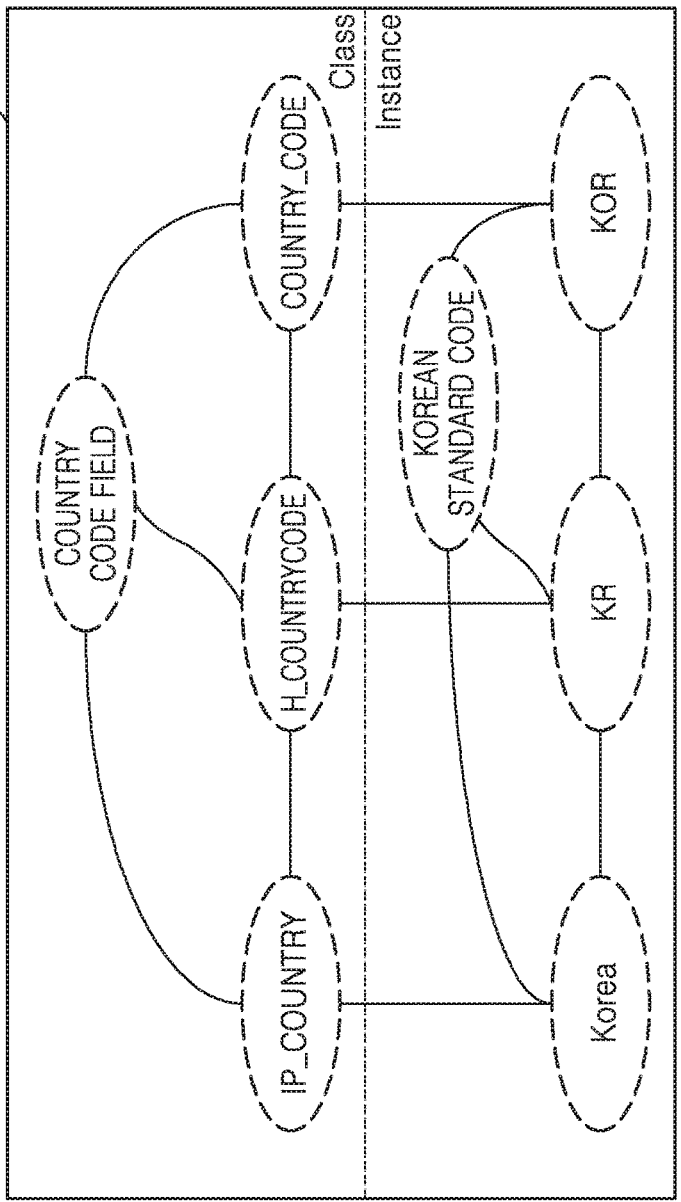
FIG. 13 is a diagram illustrating a method of an integrated knowledge graph according to an embodiment of the disclosure.

FIG. 13 is a diagram illustrating a method of generating an integrated knowledge graph representing correlation between data values according to an embodiment of the disclosure.

Referring to FIG. 13, hereinafter, a specific method, performed by a second learning model, of determining the correlation between data values will be described.

It is assumed that FIG. 13 is followed by an example of FIG. 12. It is assumed that the first database DB 1, the second database DB 2 and the third database DB 3 of FIG. 13 correspond to the first database DB 1, the second database DB 2 and the third database DB 3 of FIG. 12 respectively. In addition, it is assumed that a first class corresponding to the 'IP_COUNTRY' data field of the first database DB 1, a second class corresponding to the 'H_COUNTRY-CODE' data field of the second database DB 2, and a third class corresponding to the 'COUNTRY_CODE' data field of the third database DB 3 are in the same relation (sameAs) with each other and that a first integrated knowledge graph including information about such correlation is generated.

Tables shown together with the first database DB 1, the second database DB 2 and the third database DB 3 include only data fields determined to be in the same relation among the entire databases and data values belonging thereto. For example, data values, such as 'United States', 'Korea', 'Japan', etc. may be included in the 'IP_COUNTRY' data field of the first database DB 1, data values, such as 'KR', 'US', 'CN', etc. may be included in the 'H_COUNTRY-CODE' data field of the second database DB 2, and data values, such as 'USA', 'CHN', 'KOR', etc. may be included in the 'COUNTRY_CODE' data field of the third database DB 3. Data values belonging to even data fields in the same relation may have different values or types.

Data values of the first database DB 1 may correspond to instances of a first knowledge graph and data values of the second database DB 2 and the third database DB 3 may also correspond to instances of a second knowledge graph and a third knowledge graph, respectively. The instances may be in affiliation relation with a class corresponding to a data field.

The second learning model may receive the knowledge graphs related to DBs and analyze correlation between instances corresponding to the data values or the data values. For example, the second learning model may determine that a first instance corresponding to a 'Korea' data value of the first database DB 1, a second instance corresponding to a 'KR' data value of the second database DB 2, and a third instance corresponding to a 'KOR' data field of the third database DB 3 are in the same relation with each other.

In some embodiments of the disclosure, in addition to the plurality of knowledge graphs related to DBs, predefined standard country code information may be input to the second learning model as additional data. The second learning model may identify that the instances are a 'Korean standard code' type, based on the fact that the Korean standard code and the instance values included in the standard country code information are the same.

The second learning model may generate a second integrated knowledge graph 130 including edges (sameAs) representing that the first instance corresponding to the 'Korea' data value of the first database DB 1, the second instance corresponding to the 'KR' data value of the second database DB 2, and the third instance corresponding to the 'KOR' data field of the third database DB 3 are in the same relation with each other, based on determination that the classes are in the same relation.

The second integrated knowledge graph may include information about types of instances. For example, the second integrated knowledge graph may include edges (type) representing that the first class is in affiliation relation with the first instance, the second class is in affiliation relation with the second instance, and the third class is in affiliation relation with the third instance. In addition, for example, the second integrated knowledge graph may include an edge (type) representing that the first instance, the second instance, and the third instance are in affiliation relation with the 'Korean standard code' class.

The second integrated knowledge graph may be a virtual graph for virtually integrating and linking a plurality of databases. For example, the second integrated knowledge graph may not be obtained by substantially integrating the first, second, and third databases DB 1, DB 2, and DB 3, adding data to the original database, or changing the original database but may include information that virtually integrates and links each database in a layer different from the plurality of databases.

Figure 14A:
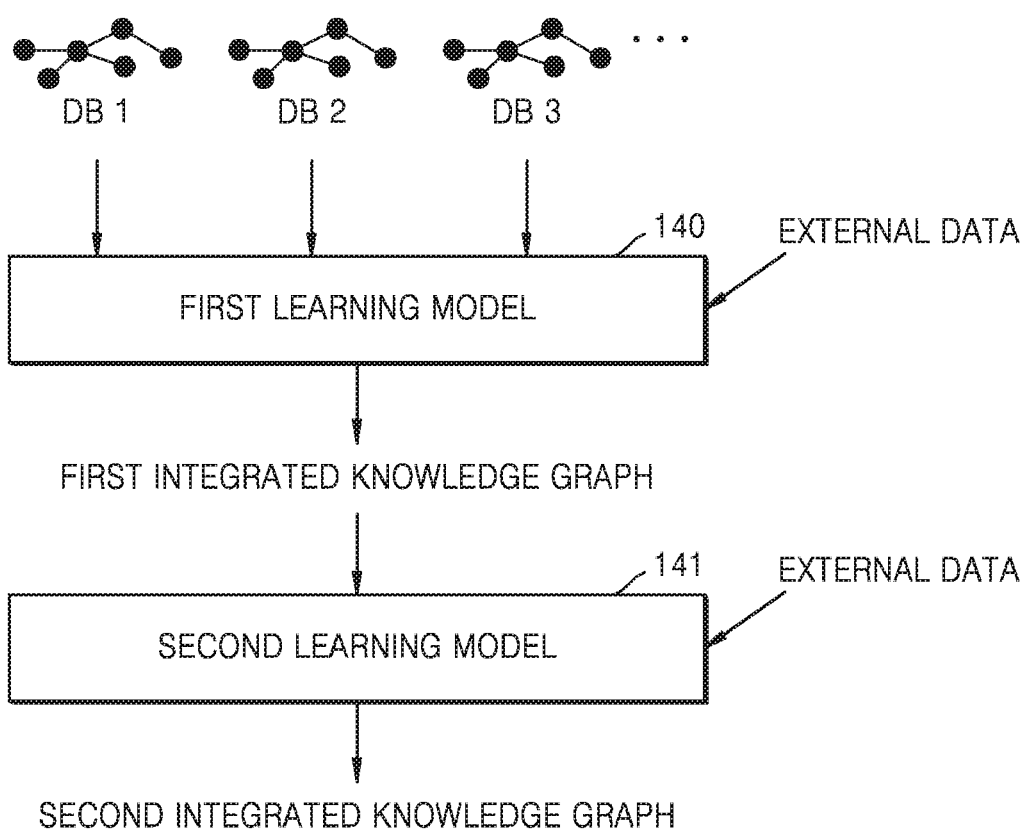
FIG. 14A is a diagram illustrating a method, performed by a server, of generating a first integrated knowledge graph and a second integrated knowledge graph using a first learning model and a second learning model respectively according to an embodiment of the disclosure.

FIG. 14A is a diagram illustrating a method, performed by a server, of generating a first integrated knowledge graph and a second integrated knowledge graph using a first learning model and a second learning model respectively according to an embodiment of the disclosure.

Referring to FIG. 14A, a first learning model 140 may receive a plurality of databases and output the first integrated knowledge graph. In addition, the first learning model 140 may further receive external data independent of the plurality of databases. The first integrated knowledge graph may include information about correlation between data fields constituting different databases.

In addition, a second learning model 141 may receive the first integrated knowledge graph and output the second integrated knowledge graph. In addition, the second learning model 141 may further receive external data independent of the plurality of databases. In addition, the second learning model 141 may further receive the plurality of databases. The second integrated knowledge graph may include information about correlation between data values included in different databases. The second learning model 141 may output the second integrated knowledge graph by extending the first integrated knowledge graph.

Figure 14B:
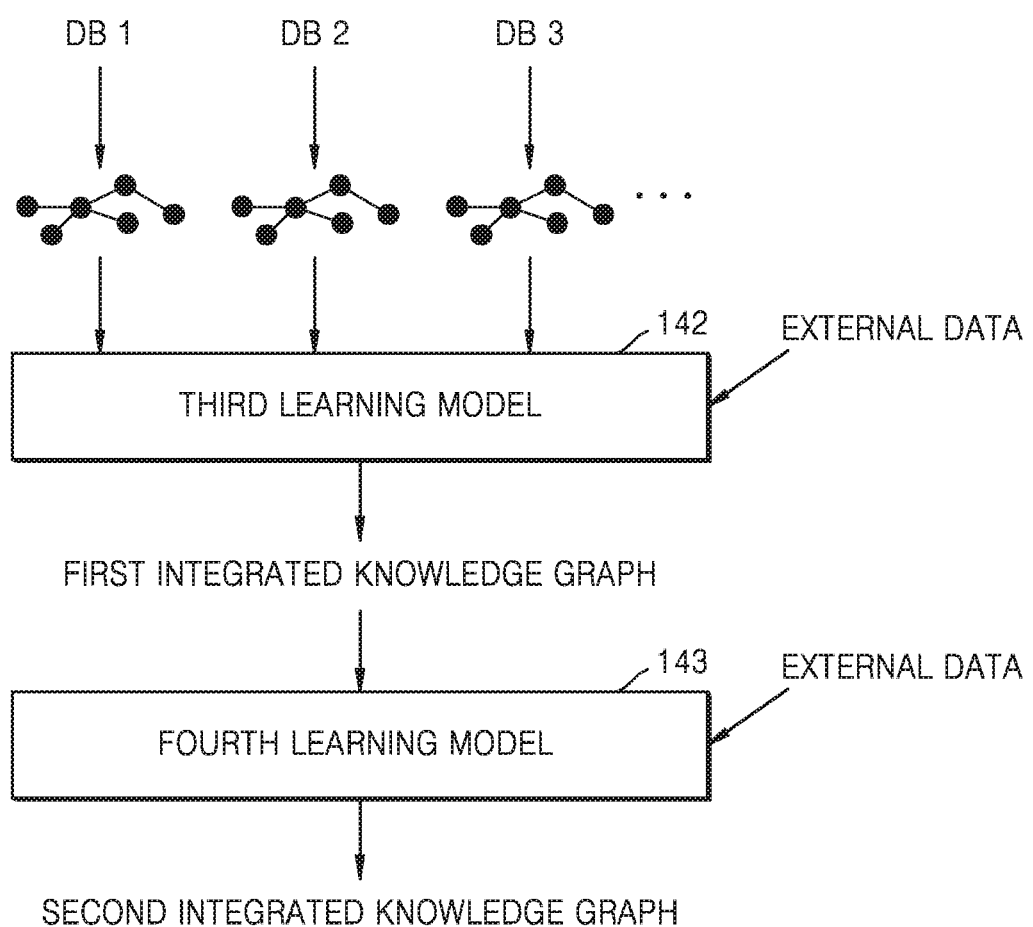
FIG. 14B is a diagram illustrating a method, performed by a server, of generating a first integrated knowledge graph and a second integrated knowledge graph using a third learning model and a fourth learning model respectively according to an embodiment of the disclosure.

FIG. 14B is a diagram illustrating a method, performed by a server, of generating a first integrated knowledge graph and a second integrated knowledge graph using a third learning model and a fourth learning model respectively according to an embodiment of the disclosure.

Referring to FIG. 14B, a third learning model 142 may receive a plurality of knowledge graphs related to DBs generated from a plurality of databases, and output the first integrated knowledge graph. The plurality of knowledge graphs may each include a location of a database, a structure of the database, and correlation between data. In addition, the third learning model 142 may further receive external data independent of the plurality of databases. The external data may be processed in the form of a knowledge graph and input to a first learning model. The first integrated knowledge graph may include information about correlation between classes included in different knowledge graphs related to DBs In addition, a fourth learning model 143 may receive the first integrated knowledge graph and output the second integrated knowledge graph. In addition, the fourth learning model 143 may receive further external data independent of the plurality of databases. The external data may be processed in the form of a knowledge graph and input to the first learning model. In addition, the fourth learning model 143 may further receive the knowledge graphs related to DBs. A fourth integrated knowledge graph may include information correlation between instances included in different knowledge graphs related to DBs. The second learning model may output the second integrated knowledge graph by extending the first integrated knowledge graph.

Figure 14C:
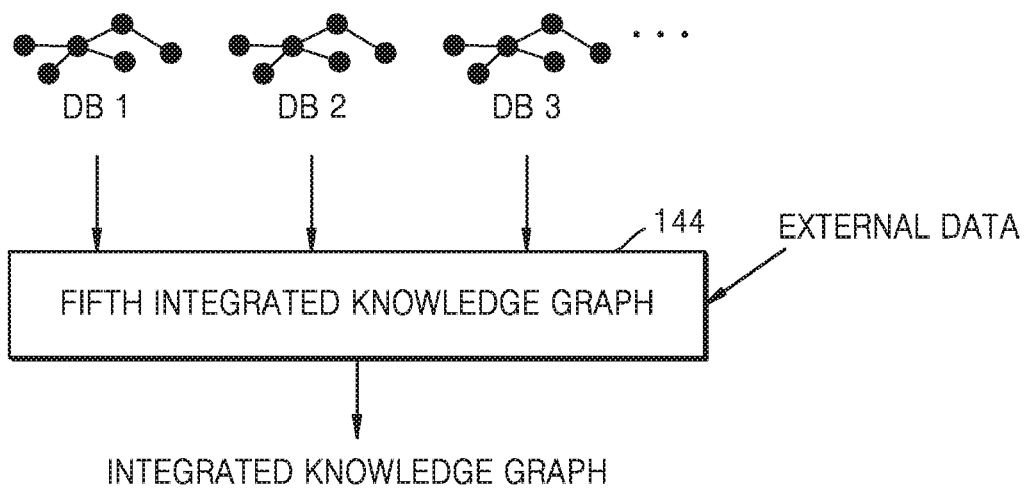
FIG. 14C is a diagram illustrating a method, performed by a device, of determining an integrated knowledge graph using a fifth learning model according to an embodiment of the disclosure.

FIG. 14C is a diagram illustrating a method, performed by a device, of determining an integrated knowledge graph using a fifth learning model according to an embodiment of the disclosure.

Referring to FIG. 14C, a fifth learning model 144 may receive a plurality of databases and output the integrated knowledge graph. In addition, the fifth learning model 144 may further receive external data independent of the plurality of databases. The integrated knowledge graph may include information about correlation between data belonging to different databases.

Figure 14D:
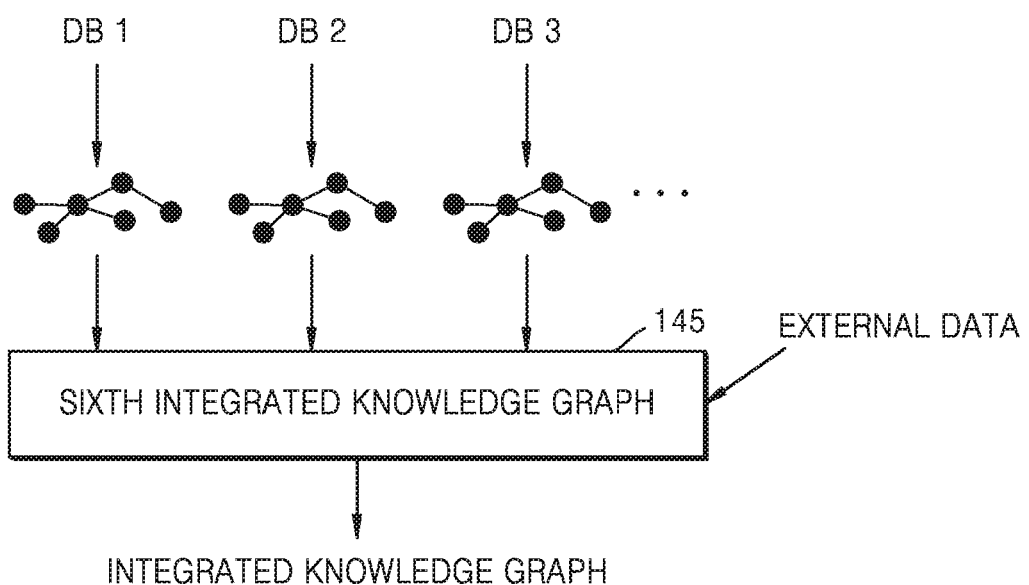
FIG. 14D is a diagram illustrating a method, performed by a device, of determining a second device knowledge graph using a sixth learning model according to an embodiment of the disclosure.

FIG. 14D is a diagram illustrating a method, performed by a device, of determining a second device knowledge graph using a sixth learning model according to an embodiment of the disclosure.

Referring to FIG. 14D, a sixth learning model 145 may receive a plurality of knowledge graphs related to DBs generated from a plurality of databases, and output an integrated knowledge graph. The plurality of knowledge graphs may each include a location of a database, a structure of the database, and a correlation between data. In addition, the sixth learning model 145 may further receive external data independent of the plurality of databases. The external data may be processed in the form of a knowledge graph and input to the sixth learning model 145. The integrated knowledge graph may include information about a correlation between nodes included in different knowledge graphs related to DBs.

FIG. 15 is a block diagram of a server according to an embodiment of the disclosure.

Referring to FIG. 15, a server 2000 according to some embodiments of the disclosure may include a communicator 2100, a memory 2200, a processor 2300, an input unit 2400, and an output unit 2500. However, not all of components shown in FIG. 15 are indispensable components of the server 2000. The server 2000 may be implemented by more components than the components shown in FIG. 15, and the server 2000 may be implemented by fewer components than the components shown in FIG. 15.

The communicator 2100 may include one or more components for communicating with the device 1000 and the content providing server 3000. For example, the communicator 2100 may include a short-range wireless communicator, a mobile communicator, and a broadcast receiver.

The communicator 2100 may transmit and receive information necessary for generating an integrated knowledge graph to and from the device 1000 and the database server 3000. The communicator 2100 may receive a database or a knowledge graph related to DB from the database server 3000.

In various embodiments of the disclosure, the communicator 2100 may transmit a user feedback request for correlation candidates to the device 1000 to generate the integrated knowledge graph, and receive a user feedback for the correlation candidates from the device 1000.

In various embodiments of the disclosure, the communicator 2100 may transmit and receive information necessary for responding to a user query for a plurality of databases to and from the device 1000 and the database server 3000. The communicator 2100 may receive the user query from the device 1000 and transmit a response message to the query to the device 1000. The communicator 2100 may transmit a response data request for the user query to the database server 3000 and receive response data from the database server 3000. The communicator 2100 may receive an integrated knowledge graph request from the device 1000 and transmit the integrated knowledge graph to the device 1000.

The memory 2200 may store a program for processing and controlling the processor 2300 and may store data input to or output from the server 2000.

In various embodiments of the disclosure, the memory 2200 may store the integrated knowledge graph. The memory 2200 may store the integrated knowledge graph such that the integrated knowledge graph is available by the device 1000, the database server 3000, or the server 2000 itself. The memory 2200 may store the integrated knowledge graph such that the integrated knowledge graph may be accessible and available by applications and devices that use the original database. The memory 2200 may store the integrated knowledge graph separately from databases and knowledge graphs related to DBs.

The processor 2300 may generally control the overall operation of the server 2000. For example, the processor 2300 may generally control the communicator 2100, the memory 2200, the input unit 2400, and the output unit 2500 by executing programs stored in the memory 2200. The processor 2300 may control operations of the server 2000 in this specification by controlling the communicator 2100, the memory 2200, the input unit 2400, and the output unit 2500, and the like.

In particular, the processor 2300 may obtain a plurality of knowledge graphs related to DBs generated from a plurality of databases. In various embodiments of the disclosure, the processor 2300 may receive a database from the database server 3000 and generate the knowledge graph from the received database. In other embodiments of the disclosure, the processor 2300 may receive the knowledge graph generated by the database server 3000 or a third server.

In various embodiments of the disclosure, the processor 2300 may input the plurality of knowledge graphs related to DBs into a learning model related to DB for determining a correlation between data in the plurality of databases. The processor 2300 may further input additional data into the learning model related to DB, besides the plurality of knowledge graphs related to DBs.

In various embodiments of the disclosure, the processor 2300 may obtain the integrated knowledge graph including the correlation output from the learning model related to DB and extracted from the plurality of knowledge graphs related to DBs. The integrated knowledge graph may include information about a location and a structure of each of the plurality of databases, and a correlation between data belonging to different databases.

In some embodiments of the disclosure, the processor 2300 may obtain information about a correlation between a first class of a first knowledge graph corresponding to a first data field constituting a first database, and a second class corresponding to a second data field of a second knowledge graph constituting a second database. The processor 2300 may obtain information about a correlation between instances belonging to the first class and instances belonging to the second class. The processor 2300 may obtain a mapping rule between the first class, the second class, the instances belonging to the first class, and the instances belonging to the second class.

In some embodiments of the disclosure, the processor 2300 may input the plurality of knowledge graphs related to DBs into a first learning model for determining correlation between data fields constituting the plurality of databases, thereby obtaining a first integrated knowledge graph. The processor 2300 may further input additional data into the first learning model, besides the plurality of knowledge graphs related to DBs. The first integrated knowledge graph may include information about a correlation between data fields belonging to different databases.

In some embodiments of the disclosure, the processor 2300 may input the plurality of knowledge graphs related to DBs and the first integrated knowledge graph into a second learning model for determining a correlation between data values constituting the plurality of databases, thereby obtaining a second integrated knowledge graph. The second integrated knowledge graph may include information about a correlation between data values belonging to different databases.

In some embodiments of the disclosure, the processor 2300 may determine a plurality of classes determined to have correlation with each other among classes included in a plurality of knowledge graphs related to DBs or a plurality of instances determined to have correlation with each other among instances included in the plurality of knowledge graphs related to DBs as correlation candidates, and request the feedback input of the user to the correlation candidates. The processor 2300 may receive the feedback input of the user for the correlation candidates. The processor 2300 may update the learning model based on the feedback input of the user for the correlation candidates.

In some embodiments of the disclosure, the processor 2300 may determine whether the plurality of databases are updated. When it is determined that there is at least one updated database among the plurality of databases, the processor 2300 may obtain an updated integrated knowledge graph by inputting the integrated knowledge graph and the updated plurality of knowledge graphs related to DBs generated from the updated plurality of databases into the learning model.

In some embodiments of the disclosure, the processor 2300 may respond to a query of a user for the plurality of databases based on a stored integrated knowledge graph. The processor 2300 may receive the query of the user from the device 1000, generate a response message for the query, and transmit the response message to the device 1000.

In some embodiments of the disclosure, the processor 2300 may generate the response message for the query using only the integrated knowledge graph.

In other embodiments of the disclosure, the processor 2300 may transmit a response data request for the user query to the database server 3000 using the integrated knowledge graph. The processor 2300 may receive response data from the database server 3000 and generate a response message from the response data using the integrated knowledge graph.

In various embodiments of the disclosure, the processor 2300 may identify the conflict between data include in the plurality of databases based on an integrated knowledge graph. The processor 2300 may derive a standardization candidate for standardizing conflicting data fields and data values. The processor 2300 may store the derived standardization candidate. The processor 2300 may determine whether a database conforms to the standard based on the standardization candidate when the database is updated and/or when a new database is added. When it is determined that the database does not conform to the standard, the processor 2300 may provide a user with a standardization proposal based on the standardization candidate.

The input unit 2400 allows a user to input data for controlling the processor 2300. For example, the input unit 2400 may include a key pad, a dome switch, a touch pad (a contact capacitance type, a pressure resistive type, an infrared ray detection type, a surface ultrasonic wave conduction type, an integral tension measurement type, a piezo effect type, etc.), a jog wheel, a jog switch, and the like, but is not limited thereto.

In various embodiments of the disclosure, the input unit 2400 may receive the feedback input of the user for the correlation candidates.

The output unit 2500 may output an audio signal or a video signal or a vibration signal and may include a display and a sound outputter.

In various embodiments of the disclosure, the output unit 2500 may output the feedback input request of the user for the correlation candidates.

Figure 16:
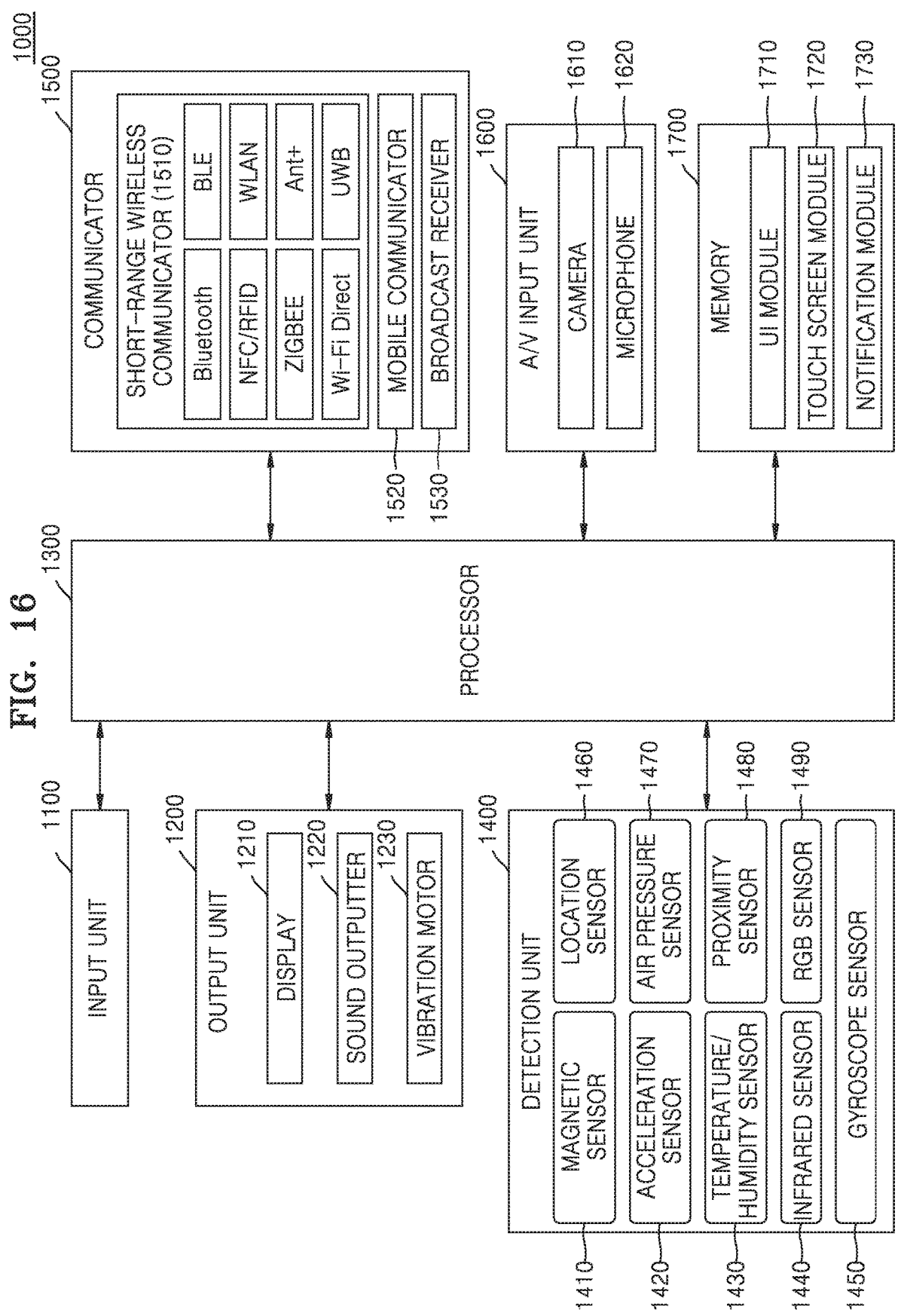
FIG. 16 is a block diagram of a device according to an embodiment of the disclosure.

FIG. 16 is a block diagram of a device according to an embodiment of the disclosure.

Referring to FIG. 16, the device 1000 according to some embodiments of the disclosure may include the input unit 1100, the output unit 1200, the processor 1300, a detection unit 1400, a communicator 1500, audio/video (A/V) input unit 1600, and a memory 1700. However, not all of components shown in FIG. 16 are indispensable components of the device 1000. The device 1000 may be implemented by more components than the components shown in FIG. 16, and the device 1000 may be implemented by fewer components than the components shown in FIG. 16.

The input unit 1100 means a means for a user to input data for controlling the device 1000. For example, the input unit 1100 may include a key pad, a dome switch, a touch pad (a contact capacitance type, a pressure resistive type, an infrared ray detection type, a surface ultrasonic wave conduction type, an integral tension measurement type, a piezo effect type, etc.), a jog wheel, a jog switch, and the like, but the disclosure is not limited thereto.

In various embodiments of the disclosure, the input unit 1100 may receive a feedback input of a user for correlation candidates.

In various embodiments of the disclosure, the input unit 1100 may receive a query input of the user for a plurality of databases. The input unit 1100 may receive the query input in the form of text, image, or speech but the disclosure is not limited thereto.

The output unit 1200 may output an audio signal or a video signal or a vibration signal and may include a display 1210, a sound output unit 1220, and a vibration motor 1230.

The display 1210 may display and output information processed by the device 1000. For example, the display 1210 may display an interface for receiving the query input of the user for a plurality of databases.

In various embodiments of the disclosure, the display 1210 may output a response message to the query.

Meanwhile, the display 1210 and a touch pad are configured as a touch screen in a layer structure, the display 1210 may be used as an input device in addition to as an output device.

The sound output unit 1220 may output audio data received from the communicator 1500 or stored in the memory 1700. In addition, the sound output unit 1220 may output a sound signal related to functions (e.g., call signal reception sound, message reception sound, and alarm sound) performed by the device 1000. The sound output unit 1220 may include a speaker, a buzzer, etc.

The vibration motor 1230 may output a vibration signal. For example, the vibration motor 1230 may output a vibration signal corresponding to an output of audio data or video data (e.g., call signal reception sound, message reception sound, etc.) In addition, the vibration motor 1230 may output the vibration signal when a touch is input to the touch screen.

The processor 1300 may generally control the overall operation of the device 1000. For example, the processor 1300 may generally control the input unit 1100, the output unit 1200, the detection unit 1400, the communicator 1500, and the A/V input unit 1600 by executing programs stored in the memory 1700. The processor 1300 may control an operation of the device 1000 in this specification by controlling the input unit 1100, the output unit 1200, the detection unit 1400, the communicator 1500, the A/V input unit 1600, etc.

Specifically, the processor 1300 may receive a query input of the user for a plurality of databases. The processor 1300 may transmit the query of the user to the server 2000 based on the query input. The processor 1300 may receive a response message for the query from the server 2000 and output the received response message.

In various embodiments of the disclosure, the processor 1300 may request the integrated knowledge graph from the server 2000 and receive the generated integrated knowledge graph from the server 2000. The processor 1300 may provide a service to the user using the received integrated knowledge graph.

In various embodiments of the disclosure, the processor 1300 may receive a feedback input request of the user for correlation candidates from the server 2000. The processor 2300 may receive the feedback input of the user for the correlation candidates and transmit the received feedback input to the server 2000.

The detection unit 1400 may detect a state of the device 1000 or a state around the device 1000 and may transmit detected information to the processor 1300.

The detection unit 1400 may include at least one of a magnetic sensor 1410, an acceleration sensor 1420, a temperature/humidity sensor 1430, an infrared sensor 1440, a gyroscope sensor 1450, a location sensor (e.g., a GPS) 1460, an air pressure sensor 1470, a proximity sensor 1480, or an RGB sensor (an illuminance sensor) 1490, but the disclosure is not limited thereto. Functions of respective sensors may be intuitively inferred from their titles and thus, detailed descriptions thereof will be omitted.

The communicator 1500 may include one or more components for communicating with the server 2000 and the content providing server 3000. For example, the communicator 1500 may include a short-range wireless communicator 1510, a mobile communicator 1520, and a broadcast receiver 1530.

The short-range wireless communicator 1510 may include a Bluetooth communicator, a Bluetooth low energy (BLE) communicator, a near field communicator, a wireless LAN (WLAN) communicator, a WLAN (WiFi) communicator, a Zigbee communicator, an infrared data association (IrDA) communicator, a Wi-Fi direct (WFD) communicator, an ultra-wideband (UWB) communicator, an Ant+ communicator, etc., but the disclosure is not limited thereto.

The mobile communicator 1520 may transmit and receive a radio signal to and from at least one of a base station, an external terminal, or a server on a mobile communication network. Here, the radio signal may include various types of data according to a speech call signal, a video call signal, or a text/multimedia message transmission/reception.

The broadcast receiver 1530 may receive a broadcast signal and/or broadcast-related information from outside through a broadcast channel. The broadcast channel may include a satellite channel and a terrestrial channel. The device 1000 may not include the broadcast receiver 1530 according to an implementation example.

In various embodiments of the disclosure, the communicator 2100 may receive a user feedback request for correlation candidates from the device 1000 to generate the integrated knowledge graph, and transmit a user feedback for the correlation candidates to the device 1000.

In various embodiments of the disclosure, the communicator 2100 may transmit a user query for a plurality of databases to the server 2000 and receive a response message for the query from the server 2000. In an embodiment of the disclosure, the communicator 2100 may request the integrated knowledge graph from the server 2000 and receive the generated integrated knowledge graph from the server 2000.

The A/V input unit 1600 is for inputting an audio signal or a video signal, and may include a camera 1610, a microphone 1620, and the like. The camera 1610 may obtain an image frame, such as an image or a moving image through an image sensor in a video communication mode or a photographing mode. An image captured through the image sensor may be processed through the processor 1300 or a separate image processor (not shown).

An image frame processed by the camera 1610 may be stored in the memory 1700 or transmitted to the outside through the communicator 1500. The camera 1610 may include two or more cameras according to a structure of a terminal.

The microphone 1620 may receive an external sound signal and process the received signal as electrical speech data. For example, the microphone 1620 may receive a sound signal from an external device or a speaker. The microphone 1620 may use various noise reduction algorithms for eliminating noise generated in a process of receiving an external sound signal.

The memory 1700 may store program for processing and controlling the processor 1300 and may store data input to or output from the device 1000.

The memory 1700 may include at least one type memory medium of a flash memory type, a hard disk type, a multimedia card micro type, a card type memory (e.g., secure digital (SD) or extreme digital (XD) memory), Random Access Memory (RAM), Static Random Access Memory (SRAM), Read Only Memory (ROM), Electrically Erasable Programmable Read-Only Memory (EEPROM), Programmable Read-Only Memory (PROM), a magnetic memory, a magnetic disk, or an optical disk.

The programs stored in the memory 1700 may be classified into a plurality of modules according to their functions, and may include, for example, a user interface (UI) module 1710, a touch screen module 1720, a notification module 1730, and the like.

The UI module 1710 may provide a specialized UI, a graphical user interface (GUI), and the like that interact with the device 1000 for each application. The touch screen module 1720 may detect a touch gesture on the user on the touch screen and may transmit information about the touch gesture to the processor 1300. The touch screen module 1720 according to some embodiments of the disclosure may recognize and analyze a touch code. The touch screen module 1720 may be configured as separate hardware including a controller.

Various sensors may be arranged inside or near the touch screen for detecting the touch on the touch screen or a close touch. A tactile sensor is an example of a sensor for detecting the touch on the touch screen. The tactile sensor refers to a sensor for detecting the touch of a specific object at a level of human feeling or at a higher level than that. The tactile sensor may detect a variety of information, such as roughness of a contact surface, hardness of a contact material, and temperature of a contact point.

In addition, a proximity sensor is an example of a sensor for detecting the touch on the touch screen.

The proximity sensor refers to a sensor for detecting the presence or absence of an object approaching a predetermined detection surface or a nearby object without mechanical contact using the force of an electromagnetic field or infrared rays. Touch gestures of the user may include a tap, a touch and hold, a double tap, a drag, a fanning, a flick, a drag and drop, a swipe, etc.

The notification module 1730 may generate a signal for notifying occurrence of an event of the device 1000. The notification module 1730 may output a notification signal in the form of a video signal through the display 1210, may output the notification signal in the form of an audio signal through the sound output unit 1220, and output the notification signal in the form of a vibration signal.

Figure 17:
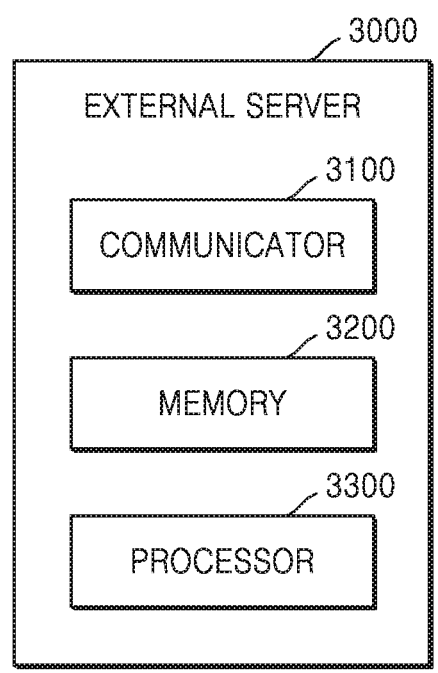
FIG. 17 is a block diagram of an external server according to an embodiment of the disclosure.

FIG. 17 is a block diagram of an external server according to an embodiment of the disclosure.

Referring to FIG. 17, an external server 3000 according to some embodiments of the disclosure may include a communicator 3100, a memory 3200, and a processor 3300. However, not all of components shown in FIG. 17 are indispensable components of the external server 3000. The external server 3000 may be implemented by more components than the components shown in FIG. 17, and the external server 3000 may be implemented by fewer components than the components shown in FIG. 17.

The communicator 3100 may include one or more components for communicating with the external server 3000. For example, the communicator 3100 may include a short-range wireless communicator, a mobile communicator, and a broadcast receiver.

In various embodiments of the disclosure, the communicator 3100 may transmit a database or a knowledge graph related to DB to the server 2000.

In various embodiments of the disclosure, the communicator 3100 may receive a response data request for a user query from the server 2000 and transmit response data to the server 2000.

The memory 3200 may store program for processing and controlling the processor 3300 and may store data input to or output from the external server 3000.

In various embodiments of the disclosure, the memory 3200 may store at least one database. In some embodiments of the disclosure, the memory 3200 may store a knowledge graph generated from the at least one database.

The processor 3300 may generally control the overall operation of the external server 3000. For example, the processor 3300 may generally control the communicator 3100 and the memory 3200 by executing programs stored in the memory 3200. The processor 3300 may control an operation of the external server 3000 in this specification by controlling the communicator 3100 and the memory 3200, etc.

In various embodiments of the disclosure, the processor 3300 may transmit the database to the server 2000. The processor 3300 may generate the knowledge graph related to DB from the database and transmit the generated knowledge graph to the server 2000.

In various embodiments of the disclosure, the processor 3300 may receive, from the server 2000, the response data request for the user query. The processor 3300 may transmit the response data to the server 2000 in response to the response data request.

Figure 18:
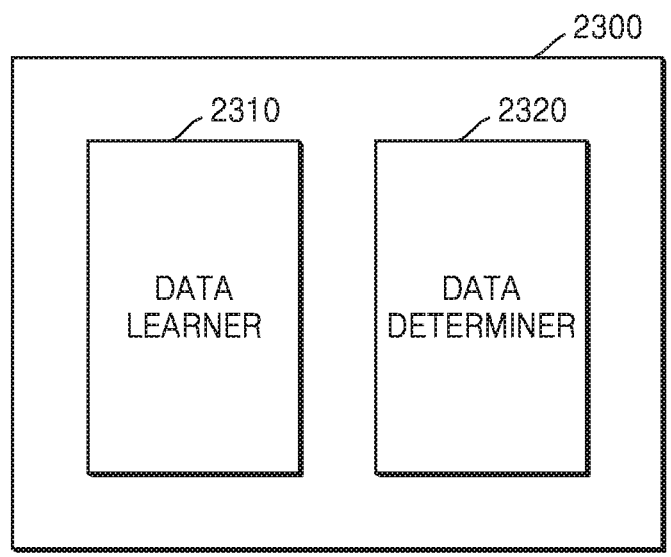
FIG. 18 is a block diagram of a processor according to an embodiment of the disclosure.

FIG. 18 is a block diagram of a processor according to an embodiment of the disclosure.

Referring to FIG. 18, the processor 2300 according to some embodiments of the disclosure may include a data learner 2310 and a data determiner 2320.

The data learner 2310 may learn a reference for generating an integrated knowledge graph. The data learner 2310 may learn the reference about what data to use for generating the integrated knowledge graph or how to generate the integrated knowledge graph using the data. The data learner 2310 may obtain data to be used for learning, and apply the obtained data to a learning model, thereby learning the reference for generating the integrated knowledge graph.

Alternatively, the data learner 2310 may learn a reference for generating a first integrated knowledge graph and a second integrated knowledge graph. The data learner 2310 may learn the reference about what data to use for generating the first integrated knowledge graph or how to generate the first integrated knowledge graph using the data. The data learner 2310 may obtain data to be used for learning, and apply the obtained data to a first learning model, thereby learning the reference for generating the first integrated knowledge graph. The data learner 2310 may learn the reference about what data to use for generating the second integrated knowledge graph or how to generate the second integrated knowledge graph using the data. The data learner 2310 may obtain data to be used for learning, and apply the obtained data to a second learning model, thereby learning the reference for generating the second integrated knowledge graph.

The data determiner 2320 may output the integrated knowledge graph. The data determiner 2320 may output the integrated knowledge graph from predetermined data using a trained learning model. The data determiner 2320 may obtain predetermined data according to a previously determined reference by learning and use the learning model having the obtained data as an input value, thereby outputting the integrated knowledge graph. Further, a resultant value output by the learning model having the obtained data as the input value may be used to refine the learning model.

Alternatively, the data determiner 2320 may output the first integrated knowledge graph and the second integrated knowledge graph. The data determiner 2320 may use the trained first learning model to output the first integrated knowledge graph from predetermined data. The data determiner 2320 may obtain the predetermined data according to a previously determined reference by learning and use the first learning model having the obtained data as an input value, thereby outputting the first integrated knowledge graph. Further, a resultant value output by the learning model having the obtained data as the input value may be used to refine the first learning model. The data determiner 2320 may use the trained second learning model to output the second integrated knowledge graph from predetermined data. The data determiner 2320 may obtain the predetermined data according to a previously determined reference by learning and use the second learning model having the obtained data as an input value, thereby outputting the second integrated knowledge graph. Further, a resultant value output by the learning model having the obtained data as the input value may be used to refine the second learning model.

At least one of the data learner 2310 or the data determiner 2320 may be manufactured in the form of at least one hardware chip and mounted on an electronic device. For example, at least one of the data learner 2310 or the data determiner 2320 may be manufactured in the form of a dedicated hardware chip for AI or may be manufactured as a part of an existing general purpose processor (e.g., a central processing unit (CPU) or an application processor) or a graphics-only processor (e.g., a graphics processing unit (GPU)) and mounted on the electronic device.

In this case, the data learner 2310 and the data determiner 2320 may be mounted on one electronic device or may be mounted on separate electronic devices. For example, one of the data learner 2310 and the data determiner 2320 may be included in the electronic device, and the other may be included in a server. The data learner 2310 and the data determiner 2320 may also provide model information constructed by the data learner 2310 to the data determiner 2320 by wired or wirelessly, and provide data input to the data determiner 2320 to the data learner 2310 as additional training data.

Meanwhile, at least one of the data learner 2310 or the data determiner 2320 may be implemented as a software module. When the at least one of the data learner 2310 or the data determiner 2320 is implemented as the software module (or a program module including an instruction), the software module may be stored in non-transitory computer readable media. Further, in this case, at least one software module may be provided by an operating system (OS) or by a predetermined application. Alternatively, one of the at least one software module may be provided by the OS, and the other one may be provided by the predetermined application.

Figure 19:
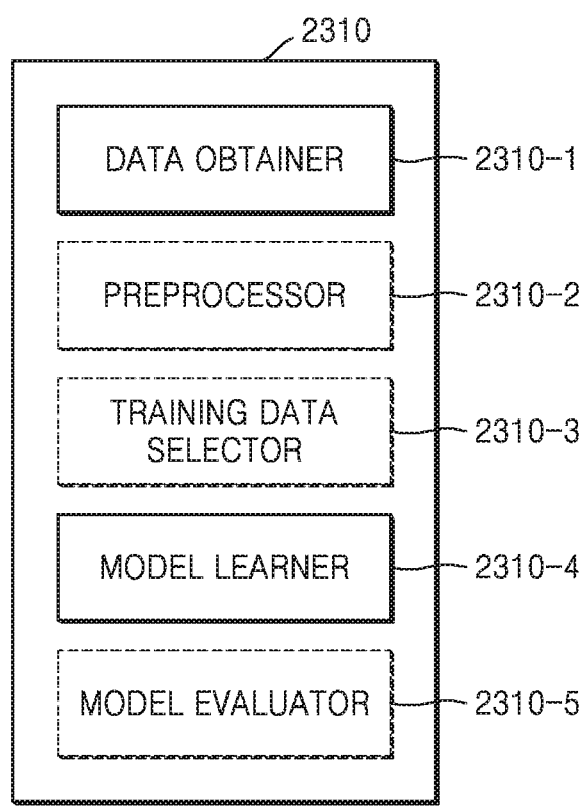
FIG. 19 is a block diagram of a data learner according to an embodiment of the disclosure.

FIG. 19 is a block diagram of a data learner according to an embodiment of the disclosure.

Referring to FIG. 19, the data learner 2310 according to some embodiments of the disclosure may include a data obtainer 2310-1, a preprocessor 2310-2, a training data selector 2310-3, a model learner 2310-4 and a model evaluator 2310-5.

The data obtainer 2310-1 may obtain data necessary for generating an integrated knowledge graph. The data obtainer 2310-1 may obtain data necessary for learning for generating the integrated knowledge graph. For example, the data obtainer 2310-1 may receive a plurality of databases from the database server 3000. For example, the data obtainer 2310-1 may obtain additional data independent of the plurality of databases.

The preprocessor 2310-2 may pre-process the obtained data such that the obtained data may be used for learning for generating the integrated knowledge graph. The preprocessor 2310-2 may process the obtained data in a predetermined format such that the model learner 2310-4, which will be described later, may use the obtained data for learning for generating the integrated knowledge graph. For example, the preprocessor 2310-2 may generate a plurality of knowledge graphs related to DBs based on the plurality of databases.

The training data selector 2310-3 may select data necessary for learning from the preprocessed data. The selected data may be provided to the model learner 2310-4. The training data selector 2310-3 may select the data necessary for learning from the preprocessed data according to a predetermined reference for generating the integrated knowledge graph. The training data selector 2310-3 may also select the data according to a predetermined reference by learning by the model learner 2310-4, which will be described later.

The model learner 2310-4 may learn a reference as to how to generate the integrated knowledge graph based on training data. In addition, the model learner 2310-4 may learn a reference as to which training data is used for generating the integrated knowledge graph.

In addition, the model learner 2310-4 may learn a learning model used for generating the integrated knowledge graph using the training data. In this case, the learning model may be a previously constructed model. For example, the learning model may be the previously constructed model by receiving basic training data.

Alternatively, the model learner 2310-4 may generate the learning model and learn the generated learning model. Further, the learning model may include a plurality of learning models. For example, the learning model may include a first learning model for determining a correlation between data fields constituting a plurality of databases, and a second learning model for determining a correlation between data values included in the plurality of databases.

The learning model may be constructed based on an application field of a determination model, a purpose of learning, or the computer performance of an apparatus, etc. The learning model may be, for example, a model based on a neural network. For example, a model, such as Deep Neural Network (DNN), Recurrent Neural Network (RNN), and Bidirectional Recurrent Deep Neural Network (BRDNN) may be used as the data determination model, but is not limited thereto.

According to various embodiments of the disclosure, when there are a plurality of learning models that are previously constructed, the model learner 2310-4 may determine a learning model having a high relevance between input training data and basic training data as the learning model. In this case, the basic training data may be previously classified according to data types, and the learning model may be previously constructed for each data type. For example, the basic training data may be previously classified according to various references, such as a region where the training data is generated, a time at which the training data is generated, a size of the training data, a genre of the training data, a creator of the training data, a type of an object in the training data, etc.

In addition, the model learner 2310-4 may train the data determination model using a learning algorithm including, for example, an error back-propagation method or a gradient descent method but the disclosure is not limited thereto.

In addition, the model learner 2310-4 may train the learning model through supervised learning using, for example, the training data as an input value. Also, the model learner 2310-4 may train the learning model through unsupervised learning to learn a type of data necessary for itself without any guidance. In addition, the model learner 2310-4 may train the learning model, for example, through reinforcement learning using feedback on whether a result of output based on the learning is correct.

For example, the model learner 2310-4 may determine a plurality of classes determined to have correlation with each other among classes included in a plurality of knowledge graphs related to DBs or a plurality of instances determined to have correlation with each other among instances included in the plurality of knowledge graphs related to DBs as correlation candidates, and request the feedback input of the user to the correlation candidates The model learner 2310-4 may train the learning model based on the feedback input of the user for the correlation candidates.

Further, when the learning model is trained, the model learner 2310-4 may store the trained learning model. In this case, the model learner 2310-4 may store the trained learning model in a memory of an electronic device including the data determiner 2320. Alternatively, the model learner 2310-4 may store the trained learning model in the memory of the electronic device including the data determiner 2320 that will be described later. Alternatively, the model learner 2310-4 may store the trained learning model in a memory of a server connected to the electronic device over a wired or wireless network.

In this case, the memory in which the trained learning model is stored may also store, for example, a command or data related to at least one other component of the electronic device. The memory may also store software and/or program. The program may include, for example, a kernel, middleware, an application programming interface (API), and/or an application program (or "application").

The model evaluator 2310-5 may input evaluation data to the learning model, and when a recognition result output from the evaluation data does not satisfy a predetermined reference, the model evaluator 2310-5 may allow the model learner 2310-4 to be trained again. In this case, the evaluation data may be predetermined data for evaluating the learning model.

Meanwhile, at least one of the data obtainer 2310-1, the preprocessor 2310-2, the training data selector 2310-3, the model learner 2310-4, or the model evaluator 2310-5 in the data learner 2310 may be manufactured in the form of at least one hardware chip and mounted on the electronic device. For example, the at least one of the data obtainer 2310-1, the preprocessor 2310-2, the training data selector 2310-3, the model learner 2310-4, or the model evaluator 2310-5 may be manufactured in the form of a dedicated hardware chip for AI or may be manufactured as a part of an existing general purpose processor (e.g., a CPU or an application processor) or a graphics-only processor (e.g., a GPU) and mounted on the electronic device.

In addition, the data obtainer 2310-1, the preprocessor 2310-2, the training data selector 2310-3, the model learner 2310-4, and the model evaluator 2310-5 may be mounted on one electronic device or may be mounted on separate electronic devices. For example, some of the data obtainer 2310-1, the preprocessor 2310-2, the training data selector 2310-3, the model learner 2310-4, and the model evaluator 2310-5 may be included in the electronic device, and the others may be included in the server.

In addition, at least one of the data obtainer 2310-1, the preprocessor 2310-2, the training data selector 2310-3, the model learner 2310-4, or the model evaluator 2310-5 may be implemented as a software module. When the at least one of the data obtainer 2-1, the preprocessor 2310-2, the training data selector 2310-3, the model learner 2310-4, or the model evaluator 2310-5 is implemented as the software module (or a program module including an instruction), the software module may be stored in non-transitory computer readable media. Further, in this case, at least one software module may be provided by an OS or by a predetermined application. Alternatively, one of the at least one software module may be provided by the OS, and the other one may be provided by the predetermined application.

Figure 20:
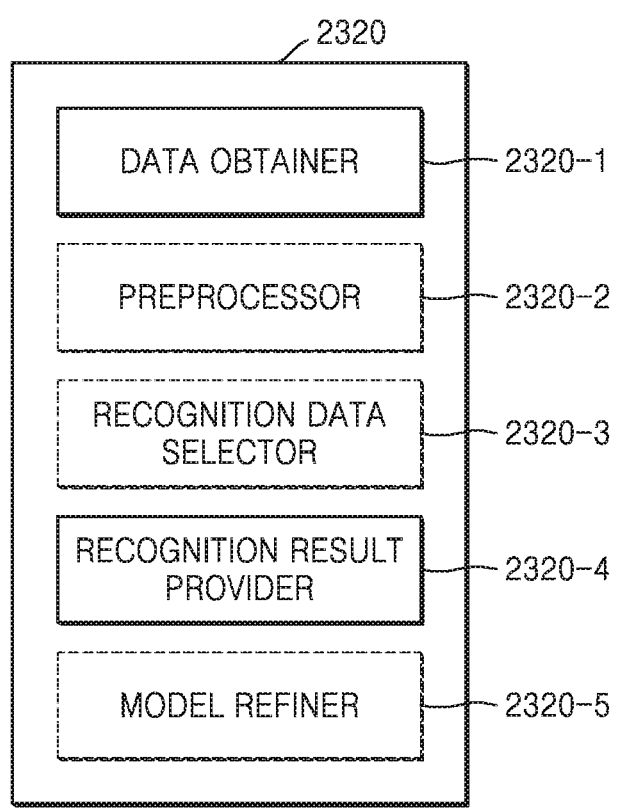
FIG. 20 is a block diagram of a data determiner according to an embodiment of the disclosure.

FIG. 20 is a block diagram of a data determiner according to an embodiment of the disclosure.

Referring to FIG. 20, the data determiner 2320 according to some embodiments of the disclosure may include a data obtainer 2320-1, a preprocessor 2320-2, a recognition data selector 2320-3, a recognition result provider 2320-4 and a model refiner 2320-5.

The data obtainer 2320-1 may obtain data necessary for generating an integrated knowledge graph, and the preprocessor 2320-2 may preprocess the obtained data such that the obtained data may be used for generating the integrated knowledge graph. The preprocessor 2320-2 may process the obtained data to a predetermined format such that the recognition result provider 2320-4 may use the obtained data for generating the integrated knowledge graph. For example, the data obtainer 2320-1 may receive a plurality of databases from the database server 3000, and the preprocessor 2320-2 may generate a plurality of knowledge graphs related to DBs based on the plurality of databases.

The recognition data selector 2320-3 may select data necessary for generating the integrated knowledge graph from the preprocessed data. The selected data may be provided to the recognition result provider 2320-4. The recognition data selector 2320-3 may select some or all of the preprocessed data according to a predetermined reference for generating the integrated knowledge graph. The recognition data selector 2320-3 may also select data according to the predetermined reference by learning by the model learner 2310-4, which will be described later.

The recognition result provider 2320-4 may generate the integrated knowledge graph by applying the selected data to a learning model. The recognition result provider 2320-4 may apply the selected data to the learning model by using the data selected by the recognition data selector 2320-3 as an input value. In addition, generation of the integrated knowledge graph may be performed by the learning model.

For example, the learning model may include a first learning model and a second learning model. In addition, for example, the integrated knowledge graph may be generated based on a first integrated knowledge graph generated from a first learning model and a second integrated knowledge graph generated from a second learning model.

The model refiner 2320-5 may use the learning model based on evaluation of the recognition result provided by the recognition result provider 2320-4. For example, the model refiner 2320-5 may provide the model learner 2310-4 with the recognition result provided by the recognition result provider 2320-4 such that the model learner 2310-4 may use the learning model.

Meanwhile, at least one of the data obtainer 2320-1, the preprocessor 2320-2, the recognition data selector 2320-3, the recognition result provider 2320-4, or the model refiner 2320-5 in the data determiner 2320 may be manufactured in the form of at least one hardware chip and mounted on the electronic device. For example, the at least one of the data obtainer 2320-1, the preprocessor 2320-2, the recognition data selector 2320-3, the recognition result provider 2320-4, or the model refiner 2320-5 may be manufactured in the form of a dedicated hardware chip for AI or may be manufactured as a part of an existing general purpose processor (e.g., a CPU or an application processor) or a graphics-only processor (e.g., a GPU) and mounted on the electronic device.

In addition, the data obtainer 2320-1, the preprocessor 2320-2, the recognition data selector 2320-3, the recognition result provider 2320-4, and the model refiner 2320-5 may be mounted on one electronic device or may be mounted on separate electronic devices. For example, some of the data obtainer 2320-1, the preprocessor 2320-2, the recognition data selector 2320-3, the recognition result provider 2320-4, and the model refiner 2320-5 may be included in the electronic device, and the others may be included in the server.

In addition, at least one of the data obtainer 2320-1, the preprocessor 2320-2, the recognition data selector 2320-3, the recognition result provider 2320-4, or the model refiner 2320-5 may be implemented as a software module. When the at least one of the data obtainer 2320-1, the preprocessor 2320-2, the recognition data selector 2320-3, the recognition result provider 2320-4, or the model refiner 2320-5 is implemented as the software module (or a program module including an instruction), the software module may be stored in non-transitory computer readable media. Further, in this case, at least one software module may be provided by an OS or by a predetermined application. Alternatively, one of the at least one software module may be provided by the OS, and the other one may be provided by the predetermined application.

Some embodiments of the disclosure may be implemented as a recording medium including computer-readable instructions, such as a computer-executable program module. The computer-readable medium may be an arbitrary available medium accessible by a computer, and examples thereof include all volatile and non-volatile media and separable and non-separable media. Further, examples of the computer-readable medium may include a computer storage medium and a communication medium. Examples of the computer storage medium include all volatile and non-volatile media and separable and non-separable media, which are implemented by an arbitrary method or technology, for storing information, such as computer-readable instructions, data structures, program modules, or other data. The communication medium generally includes computer-readable instructions, data structures, or other data of a modulated data signal, such as program modules.

In addition, in this specification, the term "unit" may be a hardware component, such as a processor or a circuit, and/or a software component executed by a hardware component, such as a processor.

It will be understood by those of ordinary skill in the art that the foregoing description of the disclosure is for illustrative purposes only and that those of ordinary skill in the art may readily understand that various changes and modifications may be made without departing from the spirit or essential characteristics of the disclosure. It is therefore to be understood that the above-described embodiments of the disclosure are illustrative in all aspects and not restrictive. For example, each component described as a single entity may be distributed and implemented, and components described as being distributed may also be implemented in a combined form.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by a server, of integrating and managing a plurality of databases (DBs), the method comprising:
   obtaining a plurality of knowledge graphs related to DBs generated from the plurality of DBs having different structures from one another, wherein the plurality of knowledge graphs related to DBs comprises classes corresponding to data fields constituting the plurality of DBs and instances corresponding to data values included in the plurality of DBs;
   obtaining a first integrated knowledge graph comprising information about a correlation between classes in the plurality of knowledge graph related to DBs, by inputting the plurality of knowledge graphs related to DBs into a first learning model; and
   obtaining a second integrated knowledge graph comprising information about a correlation between the instances in the plurality of knowledge graphs related to DBs, by inputting the plurality of knowledge graphs related to DBs and the first integrated knowledge graph into a second learning model.

2. The method of claim 1, wherein the first learning model and the second learning model comprises an artificial intelligence algorithm that is a learning model trained by using at least one of machine learning, neural network, gene, deep learning, or a classification algorithm.

3. The method of claim 1,
   wherein the first integrated knowledge graph comprises information about a correlation between a first class corresponding to a data field constituting a first DB among the plurality of DBs and a second class corresponding to a data field constituting a second DB among the plurality of DBs, and
   wherein the second integrated knowledge graph comprises information about a correlation between instances belonging to the first class and instances belonging to the second class.

4. The method of claim 3, further comprising:
   obtaining a mapping rule between the first class, the second class, the instances belonging to the first class, and the instances belonging to the second class.

5. The method of claim 1,
   wherein the correlation between the classes is determined based on types of the classes, and
   wherein the types of the classes are identified based on attributes of the classes or a statistical distribution of instance values belonging to the classes.

6. The method of claim 1, further comprising:
   determining, by using the first learning model or the second learning model, a plurality of classes determined to be in correlation with one another among the classes or a plurality of instances determined to be in correlation with one another among the instances as correlation candidates;
   receiving a feedback input of a user with respect to the correlation candidates; and
   updating the first learning model or the second learning model, based on the feedback input received from the user with respect to the correlation candidates.

7. The method of claim 1, further comprising, when the plurality of DBs are updated, obtaining an updated integrated knowledge graph by inputting the first integrated knowledge graph or the second integrated knowledge graph and updated plurality of knowledge graphs related to DBs generated from the updated plurality of DBs into the first learning model or the second learning model.

8. The method of claim 1, further comprising:
   storing the first integrated knowledge graph and the second integrated knowledge graph.

9. The method of claim 1, further comprising:
   responding to a query of a user with respect to the plurality of DBs based on the first integrated knowledge graph and the second integrated knowledge graph.

10. The method of claim 1, further comprising:
    identifying classes or instances that are in same relationship with one another but conflict with one another in a value or a format, from among classes and instances included in the first integrated knowledge graph and the second integrated knowledge graph; and
    deriving a standardization candidate for standardizing data fields and data values corresponding to the classes or instances that conflict with one another, based on the first integrated knowledge graph and the second integrated knowledge graph.

11. A server for integrating and managing a plurality of databases (DBs) based on a knowledge graph, the server comprising:
a memory storing one or more instructions; and
at least one processor configured to execute the one or more instructions to:
obtain a plurality of knowledge graphs related to DBs generated from the plurality of DBs having different structures from one another, wherein the plurality of knowledge graphs related to DBs comprises classes corresponding to data fields constituting the plurality of DBs and instances corresponding to data values included in the plurality of DBs,
obtain a first integrated knowledge graph comprising information about a correlation between classes in the plurality of knowledge graphs related to DBs, by inputting the plurality of knowledge graphs related to DBs into a first learning model, and
obtain a second integrated knowledge graph comprising information about a correlation between the instances in the plurality of knowledge graphs related to DBs, by inputting the plurality of knowledge graphs related to DBs and the first integrated knowledge graph into a second learning model.

12. The server of claim 11, wherein the first learning model and the second learning model comprises an artificial intelligence algorithm that is a learning model trained by using at least one of machine learning, neural network, gene, deep learning, or a classification algorithm.

13. The server of claim 11,
wherein the first integrated knowledge graph comprises information about a correlation between a first class corresponding to a data field constituting a first DB among the plurality of DBs and a second class corresponding to a data field constituting a second DB among the plurality of DBs, and
wherein the second integrated knowledge graph comprises information about a correlation between instances belonging to the first class and instances belonging to the second class.

14. The server of claim 11, wherein the at least one processor is further configured to:
determine, by using the first learning model related or the second learning model, a plurality of classes determined to be correlated with one another among the classes or a plurality of instances determined to be correlated with one another among the instances as correlation candidates,
receive a feedback input of a user for the correlation candidates, and
train the first learning model or the second learning model, based on the feedback input of the user for the correlation candidates.

15. The server of claim 11, wherein the at least one processor is further configured to, when the plurality of DBs are updated, obtain an updated integrated knowledge graph by inputting the first integrated knowledge graph or the second integrated knowledge graph and an updated plurality of knowledge graphs related to DBs generated from the updated plurality of DBs into the first learning model or the second learning model.

16. At least one non-transitory computer program product comprising a computer readable recording medium comprising a program to:
obtain a plurality of database (DB) knowledge graphs generated from a plurality of DBs having different structures from one another, wherein the plurality of knowledge graphs related to DBs comprises classes corresponding to data fields constituting the plurality of DBs and instances corresponding to data values included in the plurality of DBs;
obtain a first integrated knowledge graph comprising information about a correlation between classes in the plurality of knowledge graphs related to DBs, by inputting the plurality of knowledge graphs related to DBs into a first learning model; and
obtain a second integrated knowledge graph comprising information about a correlation between the instances in the plurality of knowledge graphs related to DBs, by inputting the plurality of knowledge graphs related to DBs and the first integrated knowledge graph into a second learning model.

* * * * *